US008001266B1

(12) United States Patent
Gonzalez et al.

(10) Patent No.: US 8,001,266 B1
(45) Date of Patent: Aug. 16, 2011

(54) CONFIGURING A MULTI-PROCESSOR SYSTEM

(75) Inventors: Ricardo E. Gonzalez, Redwood City, CA (US); Richard L. Rudell, Los Gatos, CA (US); Abhijit Ghosh, San Francisco, CA (US); Albert R. Wang, Los Altos, CA (US)

(73) Assignee: Stretch, Inc., Sunnyvale, CA (US)

( * ) Notice: Subject to any disclaimer, the term of this patent is extended or adjusted under 35 U.S.C. 154(b) by 1316 days.

(21) Appl. No.: 10/815,453

(22) Filed: Mar. 31, 2004

Related U.S. Application Data

(60) Provisional application No. 60/459,538, filed on Mar. 31, 2003.

(51) Int. Cl.
*G06F 15/173* (2006.01)

(52) U.S. Cl. ........................................ 709/238; 370/351

(58) Field of Classification Search .................. 709/224, 709/234, 238, 239, 240; 370/351
See application file for complete search history.

(56) References Cited

U.S. PATENT DOCUMENTS

| | | | |
|---|---|---|---|
| 4,635,261 A | 1/1987 | Anderson et al. |
| 4,766,569 A | 8/1988 | Turner et al. |
| 4,766,659 A | 8/1988 | Cronenwett et al. |
| 4,783,738 A | 11/1988 | Li |
| 4,893,311 A | 1/1990 | Hunter et al. |
| 5,055,997 A | 10/1991 | Sluijter |
| 5,247,689 A | 9/1993 | Ewert |
| 5,258,668 A | 11/1993 | Cliff et al. |
| 5,260,610 A | 11/1993 | Pedersen et al. |
| 5,260,611 A | 11/1993 | Cliff et al. |
| 5,274,581 A | 12/1993 | Cliff et al. |
| 5,274,782 A | 12/1993 | Chalasani |
| 5,299,317 A | 3/1994 | Chen |
| 5,343,406 A | 8/1994 | Freeman et al. |
| 5,357,152 A | 10/1994 | Jennings, III et al. |
| 5,361,373 A | 11/1994 | Gilson |
| 5,414,377 A | 5/1995 | Freidin |
| 5,426,378 A | 6/1995 | Ong |
| 5,436,574 A | 7/1995 | Veenstra |

(Continued)

FOREIGN PATENT DOCUMENTS

EP   0 507 507 A2   10/1992

(Continued)

OTHER PUBLICATIONS

Goldblatt, K., "The Low-Cost, Efficient Serial Configuration of Spartan FPGAs," XAPPO98, Nov. 13, 1998 (Version 1.0), XILINX.

(Continued)

*Primary Examiner* — Joseph E Avellino
*Assistant Examiner* — Marshall McLeod
(74) *Attorney, Agent, or Firm* — Carr & Ferrell LLP

(57) ABSTRACT

A source processing node communicates with a destination processing node though a channel that has bandwidth requirements and is uni-directional. The source processing node generates the channel to the destination processing node. The destination processing node then accepts the channel. The source processing node allocates a transmit buffer for the channel. The destination processing node also allocates a receive buffer for the channel. A source processing element writes data to the transmit buffer for the channel. A source network interface transmits the data from the transmit buffer of the source processing node over the channel. A destination network interface receives the data into the receive buffer for the channel. A destination processing element receives the data from the receive buffer.

35 Claims, 15 Drawing Sheets

U.S. PATENT DOCUMENTS

| | | | |
|---|---|---|---|
| 5,471,628 | A | 11/1995 | Phillips |
| 5,488,612 | A | 1/1996 | Heybruck |
| 5,517,627 | A | 5/1996 | Petersen |
| 5,535,406 | A | 7/1996 | Kolchinsky |
| 5,619,665 | A | 4/1997 | Emma |
| 5,636,224 | A | 6/1997 | Voith et al. |
| 5,652,875 | A | 7/1997 | Taylor |
| 5,682,493 | A | 10/1997 | Yung et al. |
| 5,684,980 | A | 11/1997 | Casselman |
| 5,696,956 | A | 12/1997 | Razdan et al. |
| 5,726,584 | A | 3/1998 | Freidin |
| 5,742,180 | A | 4/1998 | DeHon et al. |
| 5,784,636 | A | 7/1998 | Rupp |
| 5,794,062 | A | 8/1998 | Baxter |
| 5,819,064 | A | 10/1998 | Razdan et al. |
| 5,822,588 | A | 10/1998 | Sterling et al. |
| 5,828,835 | A * | 10/1998 | Isfeld et al. ............... 709/200 |
| 5,847,578 | A | 12/1998 | Noakes et al. |
| 5,850,564 | A | 12/1998 | Ting |
| 5,920,202 | A | 7/1999 | Young et al. |
| 5,926,036 | A | 7/1999 | Cliff et al. |
| 5,943,150 | A * | 8/1999 | Deri et al. ............... 398/89 |
| 5,956,518 | A | 9/1999 | DeHon et al. |
| 5,963,050 | A | 10/1999 | Young et al. |
| 5,977,793 | A | 11/1999 | Reddy et al. |
| 5,982,195 | A | 11/1999 | Cliff et al. |
| 5,986,465 | A | 11/1999 | Mendel |
| 5,999,734 | A | 12/1999 | Willis et al. |
| 6,026,478 | A | 2/2000 | Dowling |
| 6,092,174 | A | 7/2000 | Roussakov |
| 6,115,580 | A * | 9/2000 | Chuprun et al. ............... 455/1 |
| 6,167,502 | A | 12/2000 | Pechanek |
| 6,219,628 | B1 | 4/2001 | Kodosky et al. |
| 6,237,079 | B1 | 5/2001 | Stoney |
| 6,292,388 | B1 | 9/2001 | Camarota |
| 6,343,337 | B1 | 1/2002 | Dubey |
| 6,353,841 | B1 | 3/2002 | Marshall et al. |
| 6,374,403 | B1 | 4/2002 | Darte |
| 6,393,026 | B1 * | 5/2002 | Irwin ............... 370/401 |
| 6,415,424 | B1 | 7/2002 | Arimilli et al. |
| 6,418,045 | B2 | 7/2002 | Camarota |
| 6,426,648 | B1 | 7/2002 | Rupp |
| 6,467,009 | B1 | 10/2002 | Winegarden |
| 6,505,241 | B2 * | 1/2003 | Pitts ............... 709/218 |
| 6,557,092 | B1 | 4/2003 | Callen |
| 6,622,233 | B1 | 9/2003 | Gilson |
| 6,633,181 | B1 | 10/2003 | Rupp |
| 6,698,015 | B1 | 2/2004 | Moberg et al. |
| 6,721,866 | B2 | 4/2004 | Roussel |
| 6,721,884 | B1 | 4/2004 | De Oliveira Kastrup Pereira et al. |
| 6,732,354 | B2 | 5/2004 | Ebeling et al. |
| 6,744,274 | B1 | 6/2004 | Arnold et al. |
| 6,795,900 | B1 | 9/2004 | Miller et al. |
| 6,799,236 | B1 | 9/2004 | Dice et al. |
| 6,817,013 | B2 | 11/2004 | Tabata et al. |
| 6,831,690 | B1 | 12/2004 | John |
| 6,857,110 | B1 | 2/2005 | Rupp et al. |
| 6,874,110 | B1 | 3/2005 | Camarota |
| 6,883,084 | B1 | 4/2005 | Donohoe |
| 6,954,845 | B2 | 10/2005 | Arnold et al. |
| 6,968,544 | B1 | 11/2005 | Schneider |
| 6,986,127 | B1 | 1/2006 | Newlin |
| 6,996,709 | B2 | 2/2006 | Arnold |
| 7,000,211 | B2 | 2/2006 | Arnold |
| 7,062,520 | B2 | 6/2006 | Rupp |
| 7,086,047 | B1 | 8/2006 | Edwards |
| 7,178,062 | B1 | 2/2007 | Dice |
| 7,254,142 | B2 * | 8/2007 | Hagsand et al. ............... 370/468 |
| 7,269,616 | B2 | 9/2007 | Rupp |
| 7,350,054 | B2 | 3/2008 | Furuta |
| 7,373,642 | B2 | 5/2008 | Williams |
| 7,412,684 | B2 | 8/2008 | Gutberlet |
| 2001/0049816 | A1 | 12/2001 | Rupp |
| 2003/0097546 | A1 | 5/2003 | Taylor |
| 2003/0108119 | A1 | 6/2003 | Mohebbi et al. |
| 2003/0196058 | A1 | 10/2003 | Ramagopal et al. |
| 2004/0019765 | A1 | 1/2004 | Klein, Jr. |
| 2004/0193852 | A1 | 9/2004 | Johnson |
| 2004/0208602 | A1 * | 10/2004 | Plante ............... 398/140 |
| 2005/0166038 | A1 | 7/2005 | Wang et al. |

FOREIGN PATENT DOCUMENTS

| | | |
|---|---|---|
| EP | 0 668 659 A2 | 8/1995 |
| EP | 1 443 417 | 8/2004 |
| TW | 152355 | 7/2002 |
| TW | 152994 | 7/2002 |
| TW | 168210 | 4/2003 |

OTHER PUBLICATIONS

Scott, S. et al., "The Cray T3E Network: Adaptive Routing in a High Performance 3D Torus," HOT Interconnects IV, Aug. 15-16, 1996, Stanford University.

Golestari, S.J., "A Stop-and-Go Queuing Framework for Congestion Management," Aplications, Technologies, Architectures, and Protocols for Computer Communication, Proceedings of the ACM Symposium on Communications Architectures & Protocols, 1990, ACM Press, New York, NY USA.

Dally, W. et al., "Deadlock Free Message Routing in Mutliprocessor Interconnection Networks," Computer Science Department, California Institute of Technology, May 10, 1985.

Garland, D. et al., "An Introduction to Software Architecture," Advances in Software Engineering and Knowledge Engineering, 1993, vol. 1, World Scientific Publishing Company, New Jersey, USA.

Beeck et al., "CRISP: A Template for Reconfigurable Instruction Set Processors," FPL 2001, LNCS 2147, pp. 296-305, Springer-Verlag Berlin Heidelberg, 2001.

Bechade et al., "Programmable Arithmetic/Logic Circuits," IBM Technical Disclosure Bulletin, U.S. IBM Corp., New York, vol. 3, No. 11, Apr. 1981, pp. 4870-4873, XP-000713711.

DeHon, Andre, "Transit Note #118 Notes on Coupling Processors with Reconfigurable Logic," M.I.T. Transit Project, Last Updated Mar. 21, 1995.

Tanenbaum, Andrew S., "Modern Operating Systems," 2001, 2nd edition, Prentice Hall, New Jersey, p. 31.

Hennessy, John L. and David A. Patterson, "Computer Organization and Design: The Hardware/Software Interface," 1998, 2nd edition, Morgan Kaufmann Publishers, Inc., San Francisco, CA, p. 345.

Lee, K.C.,. "A Virtual Bus Architecture for Dynamic Parallel Processing," Feb. 1993, IEEE Transactions on Parallel and Undistributed Systems, vol. 4, No. 2, pp. 121-130.

Goldblatt, Kim, "The Low-Cost, Efficient Serial Configuration of Spartan FPGAs," Nov. 13, 1998, XAPP098 (Version 1.0), XILINX.

Scott, Steven L. and Gregory M. Thorson, "The Cray T3E Network: Adaptive Routing in a High Performance 3D Torus," Aug. 15-16, 1996, HOT Interconnects IV, Stanford University.

Golestani, S. Jamaloddin, "A Sto-and-Go Queuing Framework for Congestion Management," 1990, Proc. of the ACM Symposium on Communications Architectures & Protocols, ACM Press, New York, NY, pp. 8-18.

Dally, William J. and Charles L. Seitz, "Deadlock Free Message Routing in Multiprocessor Interconnection Networks," May 10, 1985, Computer Science Department, California Institute of Technology.

Garlan, David and Mary Shaw, "An Introduction to Software Architecture," Jan. 1994, CMU-CS-94-166, School of Computer Science, Carnegie Mellon University, Pittsburgh, PA.

Intel and Hewlett-Packard, "IA-64 Application Instruction Set Architecture Guide," Revision 1.0, 1999, pp. C-1 through C.

Hwang, Kai, "Advanced Computer Architecture: Parallelism, Scalability, Programmability," 1993, McGraw Hill, pp. 182-183.

Ye, Z.A. et al., "CHIMAERA: a high-performance architecture with a tightly-coupled reconfigurable functional unit," Jun. 10-14, 2000, Proc. of the 27th International Symposium on Computer Architecture, pp. 225-235.

MIPS Technologies, Inc., "MIPS Extension for Digital Media with 3D," 1996, pp. 1-26.

Borgatti, Michele et al., "A Reconfigurable System featuring Dynamically Extensible Embedded Microprocessor, FPGA and Customisable I/O," 2002, IEEE Custom Integrated Circuits Conference, pp. 1-4.
Razdan, Rahul and Michael D. Smith, "A High-Performance Michroarchitecture with Hardware-Programmable Functional Units," Nov. 1994, Proc. of MICRO-27, pp. 1-9.
U.S. Appl. No. 10/630,542, Kenneth Williams, Defining Instruction Extensions in a Standard Programming Language, filed Jul. 29, 2003.
U.S. Appl. No. 10/404,706, Scott D. Johnson, Extension Adapter, filed Mar. 31, 2003.
U.S. Appl. No. 10/394,824, Charle' Rupp, Transitive Processing Unit for Performing Complex Operations, filed Mar. 21, 2003.
U.S. Appl. No. 10/686,882, Kenneth Williams, Instruction Set for Efficient Bit Stream and Byte Stream I/O, filed Oct. 15, 2003.
U.S. Appl. No. 10/750,714, Ricardo Gonzalez, Systems and Methods for Software Extensible Multi-Processing, filed Dec. 31, 2003.
U.S. Appl. No. 10/815,453, Ricardo Gonzalez, Configuring a Multi-Processor System, filed Mar. 31, 2004.
U.S. Appl. No. 11/021,247, Ricardo Gonzalez, Systems and Methods for Selecting I/O Interfaces for Configurable Processors, filed Dec. 21, 2004.
U.S. Appl. No. 11/129,146, Ricardo Gonzalez, Long Instruction Word Processing with Instruction Extensions, filed May 12, 2005.
U.S. Appl. No. 11/099,280, Jeffrey M. Arnold, Video Processing System with Reconfigurable Instructions, filed Apr. 4, 2005.
U.S. Appl. No. 11/204,555, Jeffrey M. Arnold, Programmable Logic Configuration for Instruction Extensions, filed Aug. 15, 2005.
Rupp et al.; U.S. Appl. No. 10/746,018 entitled "Architecture and Method for Reconfigurable Data Path Processing" filed Dec. 23, 2003.
Barat Francisco et al. "Reconfigurable Instruction Set Processors: A Survey" IEEE 2000 0-7695-0688-2/00.
Borkar Shekhar et al. "iWarp: An Integrated Solution to High-Speed Parallel Computing" IEEE 1998 pp. 330-339.
Carrillo et al.; "The Effect of Reconfigurable Units in Superscalar Processors" 2001; ACM.
Diniz et al. "Automatic Synthesis of Data Storage and Control Structures for FPGA-based Computing Engines" 2000 IEEE pp. 91-100.
Gonzalez "Xtensa: A Configurable and Extensible Processor" Mar.-Apr. 2000 IEEE Micro pp. 60-70.
Jacob et al; "Memory Interfacing and Instruction Specification ofr Reconfigurable Processors" 1999; ACM.
Taylor Michael Bedford et al. "The Raw Microprocessor: A Computational Fabric for Software Circuits and General-Purpose Programs" Microarchitecture IEEE Micro Mar.-Apr. 2002 pp. 25-35.
Waingold Elliot et al. "Baring It All to Software: Raw Machines" Computer Sep. 1997 IEEE pp. 86-93.
http://www.tensilica.com/products/xtensa_overview.htm Xtensa Processor Overview.
U.S. Appl. No. 10/750,714, Ricardo E. Gonzalez, Systems and Methods for Software Extensible Multi-Processing, filed Dec. 31, 2003.
U.S. Appl. No. 11/021,247, Ricardo E. Gonzalez, Systems and Methods for Selecting Input/Output Configuration in an Integrated Circuit, filed Dec. 21, 2004.

* cited by examiner

CONFIGURING A MULTI-PROCESSOR SYSTEM

CROSS-REFERENCE TO RELATED APPLICATIONS

This application claims the benefit of U.S. Provisional Application Ser. No. 60/459,538 titled "Method and Apparatus for an Array of Software Extensible Processors," filed Mar. 31, 2003, which is hereby incorporated by reference.

BACKGROUND

1. Field of the Invention

The present invention relates generally to processing systems, and more particularly to configuring a multi-processor system.

2. Description of the Prior Art

Computationally intensive applications, such as modeling nuclear weaponry, simulating pharmaceutical drug interactions, predicting weather patterns, and other scientific applications, require a large amount of processing power. General computing platforms or engines have been implemented to provide the computational power to perform those applications. Such general computer computing platforms typically include multiple single-chip processors (i.e., central processor units, or CPUs) arranged in a variety of different configurations. The number of CPU's and the interconnection topology typically define those general computing platforms.

To improve the functionality, reduce cost, increase speed, etc. of the general computer computing platforms, the multi-processors and their architectures are migrating onto a system-on-a-chip (SOC). However, these conventional approaches to designing multiprocessor architectures are focused on either the general programming environment or on a particular application. These conventional approaches, however, cannot make many assumptions about (i.e., predict) or adapt their resources to optimize computations and communications in accordance with the user's application. This deficiency exists because the number of applications varies widely and each often has requirements that vary dynamically over time, depending on the amount of resources required. Also, those approaches that are focused on one particular application often provide high performance for only one specific application and thereby are inflexible to a user's changing needs. Further, the traditional approaches do not allow a user to optimize the amount of hardware for the user's specific application, resulting in a multiprocessor architecture with superfluous resources, among other deleterious effects.

Additionally, conventional approaches do not optimize communications among processors of a multiprocessor architecture for increased speeds and/or do not easily allow scalability of the processors of such an architecture. For example, one approach provides for "cache coherency," which allows for creation of a programming model that is easier to use. With cache coherency, the programming model is similar to programming a uniprocessor. However, cache coherency is expensive in terms of hardware, for example, and does not scale well as the number of nodes increases. Scaling cache coherency beyond four nodes usually requires significant hardware complexity. In contrast, another approach provides for "message passing" to obtain a more scalable solution. But this message passing typically requires the users to learn a new programming model. Furthermore, message passing machines and architectures often have additional hardware overhead as each processor element must have its own copy of the program for execution.

Some multiprocessor systems have used interface protocols, such as HyperTransport from the HyperTransport Technology Consortium of Sunnyvale, Calif., for communications between processors. Other examples of interface protocols used are Peripheral Component Interconnect (PCI) Express and RapidIO from the RapidIO Trade Association of Austin, Tex. These interface protocols have been primarily used in high-performance processing systems such as super computers, which are very expensive. The interface protocols have also been used in general purpose processing systems. In one example, one system used Hypertransport channels in an array of Advanced Micro Devices (AMD) processors from Advanced Micro Devices, Inc. of Sunnyvale, Calif. These general purpose processing systems are more expensive than embedded systems because the general purpose processing systems have to include additional functionality to run a variety of applications that may change dynamically.

Another prior communication solution is called Message Passing Interface (MPI). MPI is a standard for message passing in a parallel computing environment. In MPI, communications must first be set up between a source and destination. Then, the source sends messages to the destination, where every message specifies the source and destination. The cost of setting up the communications between the source and the destination is relatively small in terms of performance and processor cycles as compared with sending the message. However, one problem with MPI is that the communications between the source and destination are not guaranteed. Thus, some packets of data sent under MPI can get lost. Another problem with MPI is that there is no mechanism for a reservation of bandwidth.

Another prior art solution is called sockets. A socket is an application program interface between a user application program and Transmission Control Protocol/Internet Protocol (TCP/IP). In TCP/IP, a connection is initiated between a current host and a specified host through a port. The specified host then accepts the connection from the current host through another port. Once the connection is established, the connection is bidirectional, where either host may read or write to the other. Multiple hosts may also connect to a single host, which then queues the connections. One problem with this queuing is the delay experienced by having many connections, which decreases overall application performance.

The combination of TCP and IP provides reliability over an unreliable network. If packets of data were lost in the IP layer, then TCP would require that the packets be resent. However, one problem with sockets is that in order to provide this reliability, large amounts of buffering are required. Another problem is that the operation of sockets is expensive in terms of performance and processing cycles. For example, the processor running sockets has to perform many communication functions that cost processor cycles.

When running applications in a multiple processor environment, the applications need to be compiled into the executables that each processor will execute. Standard C and C++ compilers do not provide the required functionality for a multi-processor environment. One prior solution called VX Works from Wind River is an embedded operating system. In VX Works, certain attributes of the multi-processor system can be specified before compilation. These attributes include the number of processors and what tasks are being executed on which processors. Upon compilation, the operating system, boot code, and user application are all combined into a single executable. However, one problem is that VX Works only has limited functionality for a multi-processor system. Specifically, the linker, debugger, and system description framework do not support multi-processor systems. For example, when a debugger is attached to a chip running VX works, the state of multiple processors cannot be seen. After compilation, the multi-processor system needs to boot up from an inactive or reset state. In most multi-processor systems, each processor has a FLASH memory associated with the processor. For the boot process, the processor reads boot code from the FLASH memory and begins executing the boot code. The processor then configures itself based on the boot code. The processor then determines the processor number or identification and then detects neighboring processors. Once configured, the processor transmits a message to a root processor indicating that the processor has completed the booting process. One problem is that not all multi-processor systems have FLASH memory associated with the processor. Thus, there is no FLASH memory to store the boot code to begin the boot process.

SUMMARY OF THE INVENTION

The invention addresses the above problems by configuring a multi-processor system. A source processing node communicates with a destination processing node though a channel that has bandwidth requirements and is uni-directional. The source processing node generates the channel to the destination processing node. The destination processing node then accepts the channel. The source processing node allocates a transmit buffer for the channel. The destination processing node also allocates a receive buffer for the channel. A source processing element writes data to the transmit buffer for the channel. A source network interface transmits the data from the transmit buffer of the source processing node over the channel. A destination network interface receives the data into the receive buffer for the channel. A destination processing element receives the data from the receive buffer.

In some embodiments, the channel is associated with a first port in the source processing element and a second port in the destination processing element. The channel may have a maximum number of buffers and a maximum size of the buffer. In some embodiments, the source processing node and the destination processing node reserve intermediate resources for the channel based on the bandwidth requirements. In some embodiments, the source processing node guarantees bandwidth based on the bandwidth requirements using time division multiplexing. In some embodiments, the source processing node guarantees bandwidth based on the bandwidth requirements using spatial division multiplexing. The source processing element may free the transmit buffer, and the destination processing element may free the receive buffer.

In some embodiments, a package compiler receives a physical description of the multi-processor system. The package compiler also receives an application description indicating tasks for the applications and channels for communications between the tasks. The package compiler then processes the physical description and the application description to determine routing information for the channels and to assign the tasks to processors in the multi-processor system. The package compiler generates executable code for the processors based on the physical description and the application description.

In some embodiments, the physical description includes a configuration of processors in the multi-processor system. The application may include application code for the tasks, assignments of the tasks to execute on processors of the multi-processor system, channels for communications, routing for the channels, and shared memory descriptions. In some embodiments, the package compiler processes the physical description and the application description to check for syntax and semantic errors. In some embodiments, the package compiler generates boot code for the processors in the multi-processor system.

In some embodiments for booting, a multi-processor system includes a root processor and some non-root processors. The root processor identifies itself as a root and transmits a boot message to the non-root processor. The non-root processor does not have memory associated with it. The non-root processor receives the boot message and obtains the non-root boot code based on the boot message. The non-root processor configures itself based on the non-root boot code.

DETAILED DESCRIPTION OF THE INVENTION

Figure 1:
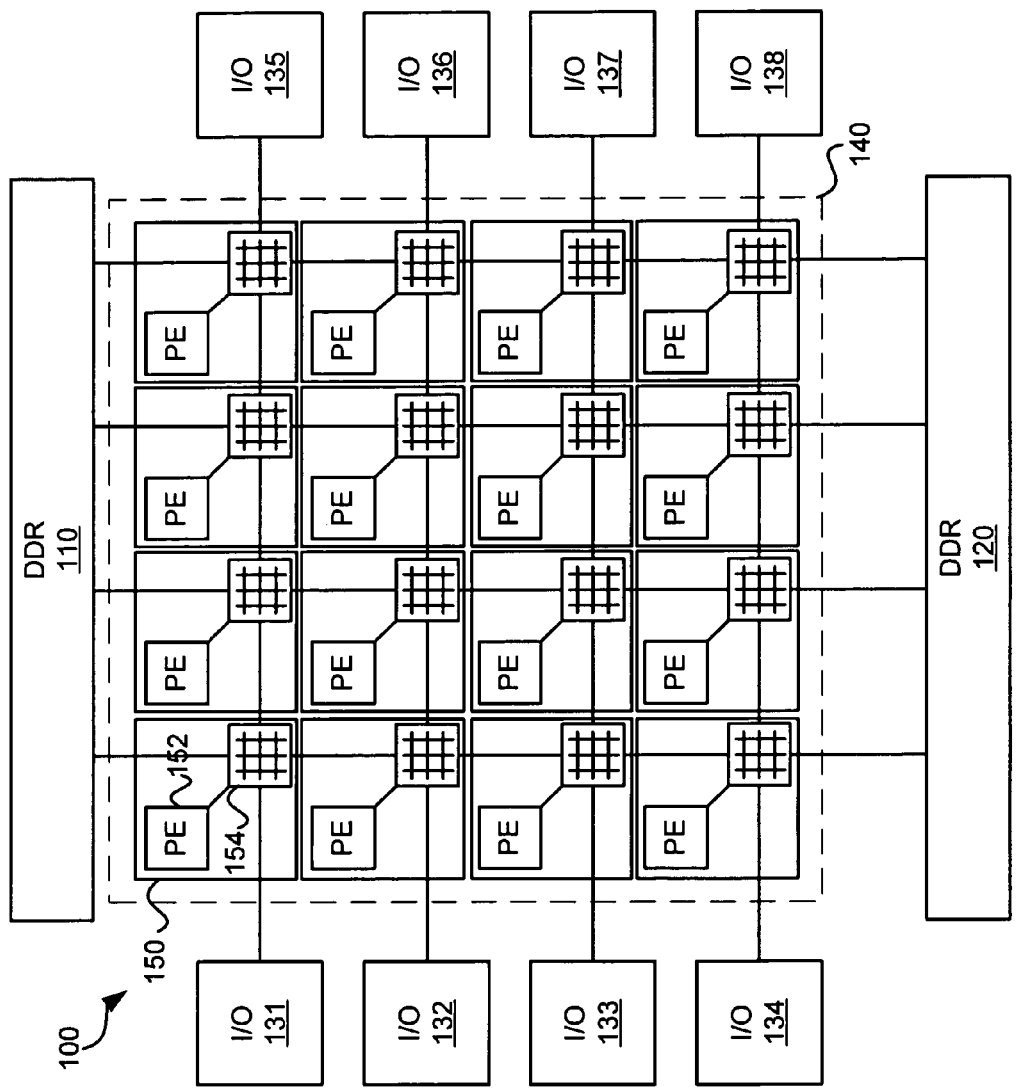
FIG. 1 is a diagram of a processing system in an exemplary implementation of the invention.

As shown in the exemplary drawings wherein like reference numerals indicate like or corresponding elements among the figures, exemplary embodiments of a system and method according to the present invention are described below in detail. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process or manner.

Figure 2:
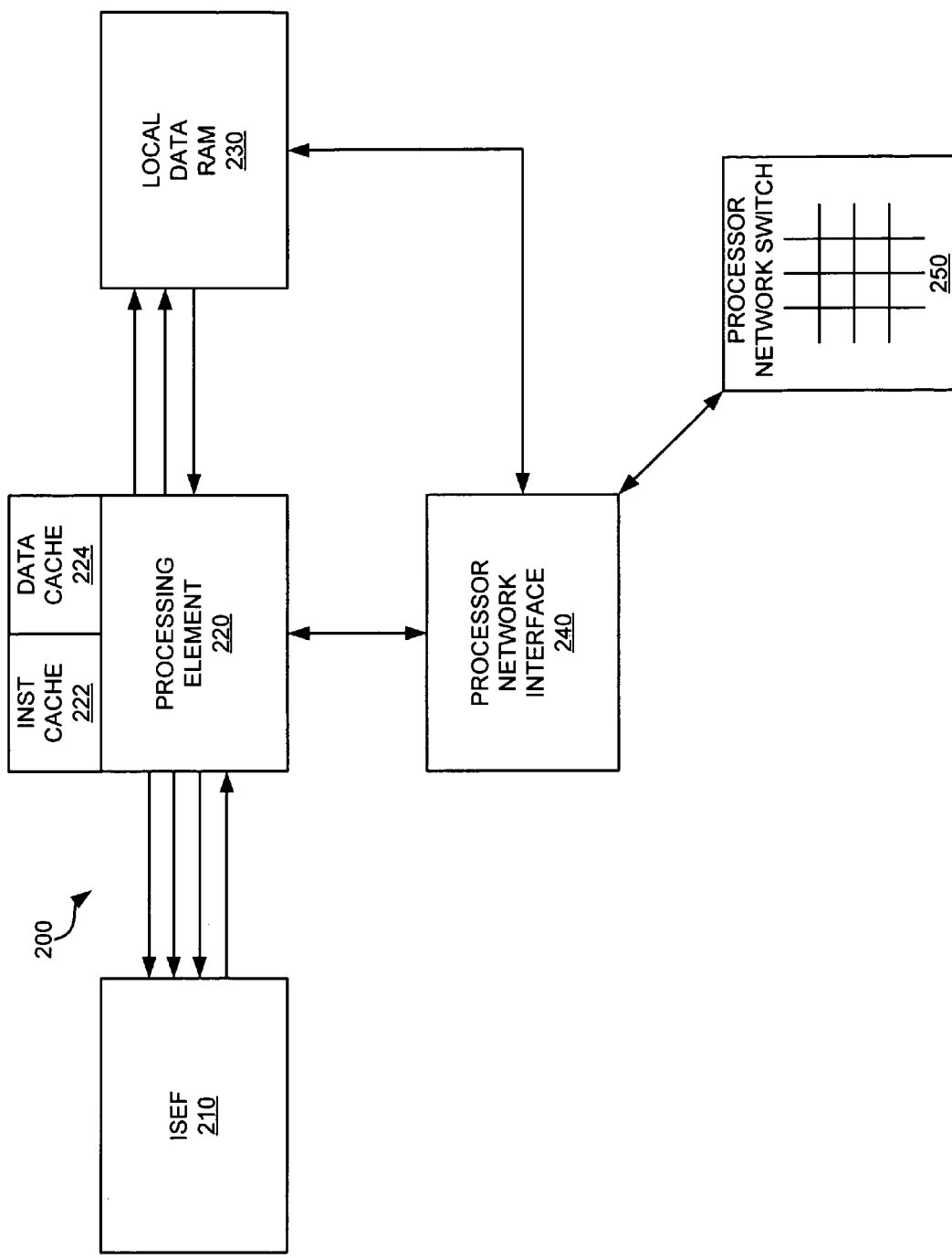
FIG. 2 is a diagram of a processor node in an exemplary implementation of the invention.

Processing System—FIGS. 1-2

FIG. 1 depicts a diagram of a processing system 100 in an exemplary implementation of the invention. The processing system 100 includes Double Data Rate (DDR) memory controllers 110 and 120, Input/Output (I/O) devices 131-138, and an array of processor nodes 140. In this embodiment, the array of processor nodes 140 is a four by four array of processor nodes 150. Other embodiments comprise various combinations of numbers and different configurations of processor nodes to form a multiprocessor architecture. The multiprocessor architecture including such an array of processor nodes can be scaled to form a multiprocessor of any number of processor nodes, such as four by four processor nodes or sixteen by sixteen processor nodes. In some embodiments, such scaling can be selected according to a particular manufacturing process on which the array of processing nodes 140 are suitable for operating upon. In other embodiments, the multiprocessor architecture includes processor nodes not in an array configuration.

In some embodiments, the array of processor nodes 140 is implemented as a multiprocessor system-on-a-chip, where multiple processor nodes 150 are integrated into a single chip. In some embodiments, the array of processor nodes 140 is a collection of chips on a board, where each chip comprises a processor node 150. In some embodiments, some of the processor nodes are different from each other creating a heterogeneous array of processor nodes 140.

The following description is for processor node 150 but also applies to the other processing nodes in the array of processor nodes 140. The processor node 150 comprises a processing element (PE) 152 and a processor network switch 154. The processor network switch 154 is coupled to the processing element 152. The processor network switch 154 is coupled to neighboring processor network switches in other processor nodes, the DDR memory controller 110, and the I/O device 131. A description of the processor node 150 is discussed in further detail below in FIG. 2.

FIG. 2 depicts a diagram of a processor node 200 in an exemplary implementation of the invention. The processor node 200 includes an instruction set extension fabric (ISEF) 210, a processing element 220, an instruction (INST) cache 222, a data cache 224, a local data random access memory (RAM) 230, a processor network interface 240, and a processor network switch 250.

The ISEF 210 is coupled to the processing element 220. The ISEF 210 includes programmable logic for enabling application-specific instructions ("instruction extensions") to be stored and executed. The ISEF 210 provides the ability to add additional instructions to a set of standard instructions for the processing element 220. The ISEF 210 is a type of software extensible device. In some embodiments, the ISEF 210 comprises a programmable logic device. One example of the ISEF 210 is described in U.S. application Ser. No. 10/404,706 filed on Mar. 31, 2003 and titled "Reconfigurable Instruction Set Computing", which is hereby incorporated by reference. The new instructions and the ISEF 210 are described in the technology incorporated by reference, such as those described in the U.S. patent application entitled "System and Method for Efficiently Mapping Heterogeneous Objects Onto an Array of Heterogeneous Programmable Logic Resources," filed Mar. 31, 2003, U.S. Ser. No. 10/404,680, which is hereby incorporated by reference.

The processing element 220 is a processor configured to execute applications. The processing element 220 includes a standard or native instruction set that provides a set of instructions that the processor element 220 is designed to recognize and execute. These standard instructions are hard-coded into the silicon and cannot be modified. One example of the processing element 220 is an Xtensa processor, from Tensilica, Inc., of Santa Clara, Calif. One example of the processing element 220 is also described in U.S. application Ser. No. 10/404,706 filed on Mar. 31, 2003 and titled "Reconfigurable Instruction Set Computing."

The processing element 220 is coupled to an instruction cache 222 and a data cache 224. The instruction cache 222 is a cache configured to store instructions for execution either permanently or temporarily. The data cache 224 is a cache configured to store data either permanently or temporarily. The local data RAM 230 is also coupled to the processing element 220.

The local data RAM 230 is any local memory for the processing element 220 that is configured to store data. In one embodiment, an exemplary size of the local data RAM 230 is 128 kB or 256 kB. The local data RAM 230 can operate as a buffer for buffering incoming and outgoing messages in accordance with a "channel" implementation. In some embodiments, the local data RAM 230 is either a single-ported or dual-ported RAM.

The processor network interface 240 is coupled to the processing element 220. The processor network interface 240 operates as a conduit between the processing element 220 and the network of the array of processor nodes 140. The processor network interface 240 is a communication interface configured to receive data from the processing element 220 and transfer the data to the processor network switch 250 for transport over the network of the array of processor nodes 140. When the processor network interface 240 receives data through the processor network switch 250 from the network of the array of processor nodes 140, the processor network interface 240 transfers the data to the processing element 220. In one embodiment, the processor network interface 240 is coupled directly to the Xtensa Processor Interface (PIF) for the processing element 220, which is an Xtensa processor. In another embodiment, the processor network interface 240 is coupled to the processing element 220 through an Advanced Microcontroller Bus Architecture (AMBA) Advanced High-performance Bus (AHB) bus. In this embodiment, the attachment to the AMBA AHB bus adds a few more cycles of latency to pass data from the processing element 220 to the processor network interface 240.

The processor network interface 240 is also coupled to the local data RAM 230. In one embodiment, the processor network interface 240 is coupled to the local data RAM 230 through a dedicated port on the processor network interface 240 to transfer channel data between the processor nodes in the array of processor nodes 140.

In some embodiments, a programmer can take advantage of the data passing by the processor network interface 240 by using two methods. The first method is by using a memory mapped interface. Using a memory mapped interface, the processing element 220 generates a request to read or write a memory location. The processor network interface 240 then receives the request on the PIF or the AHB bus. The processor network interface 240 then wraps the data as a network packet and transfers the packet onto the transport layer of an Open System Interconnect (OSI) layer, which is implemented by the processor network switch 250. When the processor network interface 240 receives a response packet, the processor network interface 240 strips the packet control information and returns the data to the processing element 220 as a transaction on the PIF or AHB bus.

The second method of data passing is by programming using channels. A channel corresponds to a unidirectional stream of data flowing from source to destination. Data injected by the source is transmitted to the destination and delivered in-order. To the programmer, however, channels appear as another memory allocation interface. To send data the programmer allocates a block in memory. When the programmer is done processing the data, the programmer can simply call a subroutine (send) that automatically transmits the data to the destination. The hardware performs the data copying autonomously. This corresponds to a Direct Memory Access (DMA) that copies the data from one memory to another. In one embodiment, the DMA engine transmits the data by encapsulating it into a packet and transmitting it via the network. At the destination, the DMA engine removes the encapsulation and writes the data into the memory. The hardware ensures that no data is lost and that the source does not inject more data than the destination can process. This method of using channels is described in further detail below in FIGS. 5-9.

One advantage is that the send and receive software primitives turn access to a stream of data into a memory allocation and they can do this in constant time (i.e. the time to execute the primitive does not depend on the size of the buffer). Converting a stream into a memory buffer is a new programming paradigm.

Information (i.e. data, instructions, etc.) is communicated by "message-passing" among arrayed processor nodes. Accordingly, each processing node is associated with a unique node identifier or address ("node ID") by using a packet switched-like network to communicate information between at least two nodes by passing messages including such information. A packet in accordance with one embodiment includes a header and a payload. The processor network switch 250, in some cases, can operate as a "router" as packets are received and either accepted into the processor node 200, or passed on to another switch of another processor node. In one embodiment, the process of message-passing runs in the background without user intervention (e.g., a user need to use these types of explicit message-passing instructions: msg( ) and/or send ( )). Furthermore, by using the exemplary message-passing process, "virtual channels" (i.e., without regard to actual number of physical hops) can be used to pass information (e.g., data) to describe to a user how sub-processes (i.e., processing elements) are interrelated.

In some embodiments, the processor network interface 240 also performs any reads or writes of the local data RAM 230 that are posted to the AHB bus. When other devices need access to the local data RAM 230, the processor network interface 240 provides a way to share its dedicated port to the local data RAM 230.

The processor network interface 240 is coupled to the processor network switch 250. The processor network switch 250 is a communication interface configured to exchange data with the processor network interface 240. In some embodiments, the processor network switch 250 exchanges data with other network switches in the array of the processor nodes 140. In some embodiments, the processor network switch 250 exchanges data with other devices coupled to the array of the processor nodes 140. In some embodiments, the processor network switch 250 implements the network and link layers of the OSI model and interfaces directly with the physical link.

In operation, as the processing element 220 executes instructions from the instruction cache 222, the processing element 220 can encounter a customized instruction for execution. In this instance, the processing element 220 executes that customized instruction on the ISEF 210. For example, consider a user generates a "C" program code that yields a new instruction, "Packet Lookup," for a networking application. After compiling this instruction, for example, the compiled new instruction is programmed into the ISEF 210 for execution of this specialized instruction.

Figure 3:
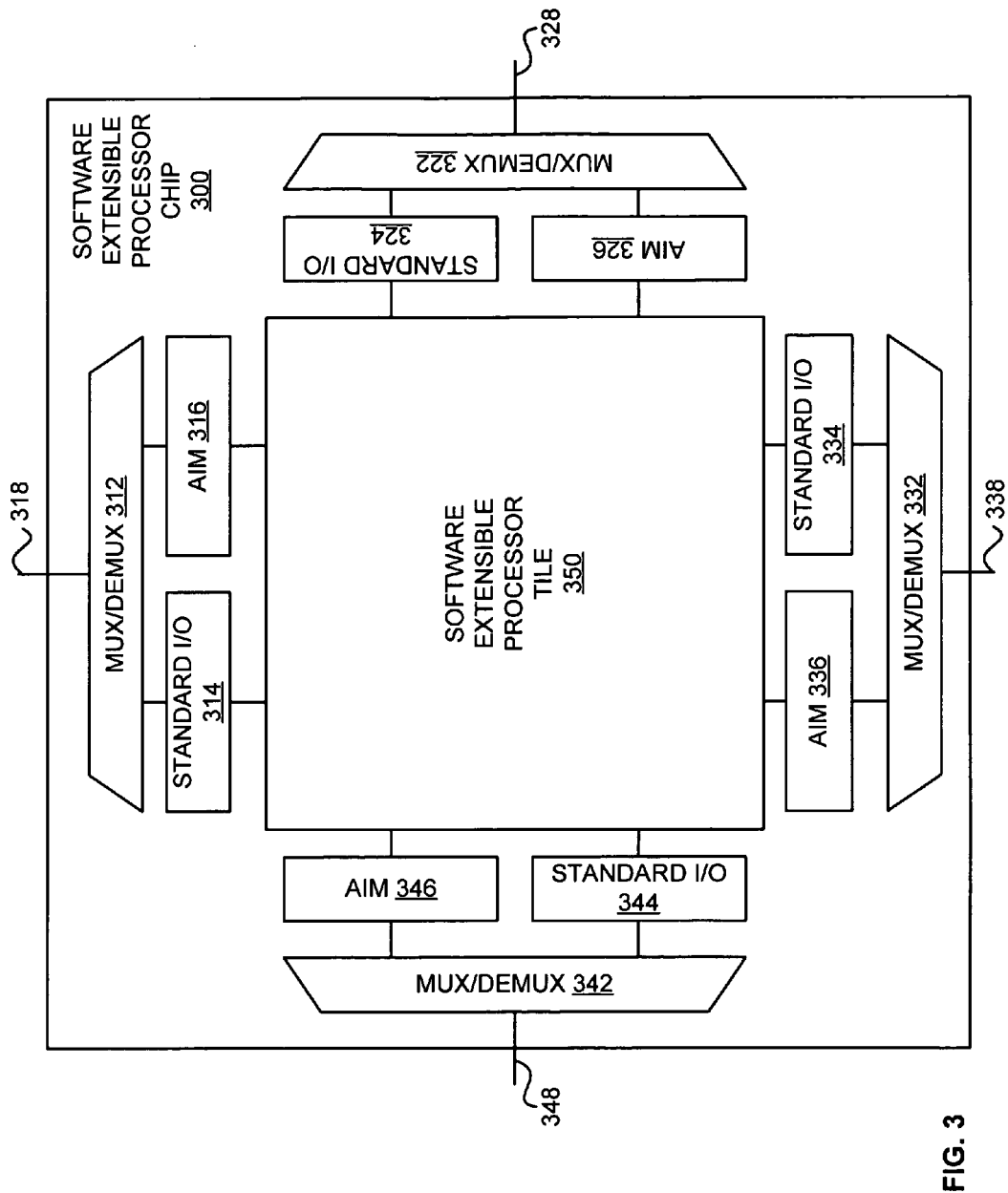
FIG. 3 is a diagram of a software extensible processor chip in an exemplary implementation of the invention.

Board Level Array of Processing Nodes—FIG. 3

In some embodiments, each of the processor nodes is on a separate chip. The chips can be configured together on a board to form the array of processing nodes 140 as depicted in FIG. 1.

FIG. 3 depicts a diagram of a software extensible processor chip 300 in an exemplary implementation of the invention. The software extensible processor chip 300 includes multiplexer/demultiplexers (mux/demux) 312, 322, 332, and 342, standard I/O interfaces 314, 324, 334, and 344, array interface modules (AIM) 316, 326, 336, and 346, and a software extensible processor tile 350. The software extensible processor tile 350 is a processor node 200 as described in FIG. 2. The software extensible processor tile 350 is coupled to the standard I/O interfaces 314, 324, 334, and 344 and AIMs 316, 326, 336, and 346. The standard I/O interface 314 is an interface configured to handle standard I/O processing between chips. Some examples of the standard I/O interfaces 314 are a peripheral component interconnect (PCI) interface, a DDR interface, and a universal asynchronous receiver/transmitter (UART) circuitry. The standard I/O interface 314 is coupled between the software extensible processor tile 350 and the mux/demux 312. The other standard I/O interfaces 324, 334, and 344 have similar operations and configurations as the standard I/O interface 314.

The AIM 316 is an interface or circuitry configured to handle a protocol for communication between software extensible processor chips 300. In some embodiments where processing nodes are on the same chip, the network switches can be coupled through wires. In other embodiments where processing nodes are on different chips, a different protocol for handling off-chip communications with other processing nodes is needed. The AIM 316 handles these off-chip communications with other software extensible processor chips to provide a physical layer to couple the software extensible processor chips together. In some embodiments, the protocol that the AIM 316 uses handles buffering between the processor chips. In some embodiments, the protocol that the AIM 316 uses accounts for latency problems for communications that go off-chip. The AIM 316 is coupled between the software extensible processor tile 350 and the mux/demux 312. The other AIMs 326, 336, and 346 have similar operations and configurations as the AIM 316.

The mux/demux 312 is configured to multiplex or demultiplex between the link 318 and the standard I/O interface 314 and the AIM 316. The mux/demux 312 is also configured to select between the standard I/O interface 314 and the AIM 316 based on the type of neighboring device that the link 318 is coupled to. For example, if the neighboring device is an I/O device, then the mux/demux 312 is configured to select the standard I/O interface 314. If the neighboring device is another software extensible processor chip, then the mux/demux 312 is configured to select the AIM 316. In some embodiments, software or external pins determine the selection. The other mux/demuxes 322, 332, and 342 have similar operations and configurations as the mux/demux 312.

Programming Model—FIGS. 4-9

An exemplary programming model is provided to allow expedient design of a multiprocessor architecture, where such an architecture includes one or more processor nodes. In such a model, the physical hardware is not readily apparent to the programmer, but is represented by abstractions so that a programmer's application can be embodied in a scalable architecture. The programmer can use block diagrams to represent the functionalities of the application, where these diagrams map to a group of processing nodes. In this way, the programmer can design and manufacture one or more chips having four processors or up to 256 processor nodes (i.e., a 16 by 16 grid of nodes), wherein the processors can be configured to use thread-level parallelism, including instruction-level parallelism ("ILP") with ISEF and/or very long instruction set words ("VLIW"). The programmer may also partition the application and identify communications between processors.

Figure 4:
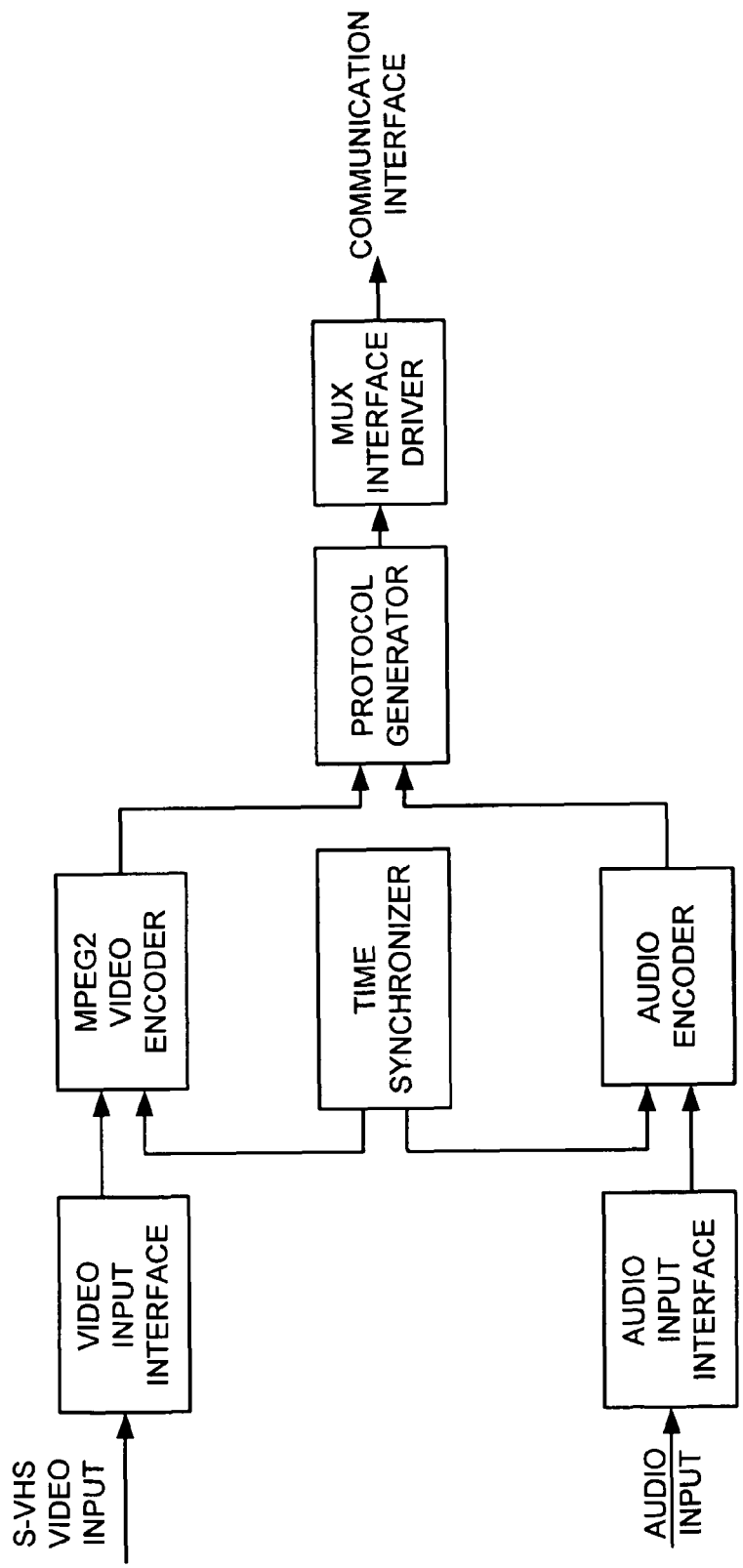
FIG. 4 is a block diagram for embedded applications in an exemplary implementation of the invention.

FIG. 4 depicts a block diagram for embedded applications in an exemplary implementation of the invention. FIG. 4 depicts one example of applications for an embedded system that is compiled and loaded into the array of processor nodes 140 of FIG. 1. An embedded application is a computer program or set of instructions for an embedded system. Some examples of embedded applications are a video encoder and a protocol generator.

Most embedded systems are "static." One example of an embedded system is a set top box. Most properties for the embedded system are known ahead of time. In the set top box example, the largest image size and highest resolution are known before running the embedded applications. For these reasons, the programming model may be "static." In some embodiments, dynamic communication through dynamic channels may be allowed. However, certain dynamic functions such as task migration to other processing elements or changes of bandwidth performance cause an overall loss in system performance.

Each block in FIG. 4 represents a task. Each task corresponds to one "thread" of execution or an executable. In some embodiments, the tasks are compiled separately. In one embodiment, each task includes a processor context, a program counter, and a virtual address space to prevent interference with other tasks. The tasks may be instantiated multiple times. With these instances, tasks may pass instance-specific values to another task by using task parameters. The task may also have task attributes that place requirements and/or limits to the tasks. Some examples of limitations are number of cycles consumed or amount of memory allocated for the task.

In some embodiments, at compile time, the programmer can specify how many tasks will be executing in parallel, how those tasks communicate via channels, what the memory and computation requirements are for each task, and so on. In some embodiments, the embedded application is recompiled and reloaded to change the system parameters.

In FIG. 4, the programmer may partition the blocks into smaller blocks for optimal implementation into the array of processor nodes 140. Additionally, certain blocks may be combined into a single processor node in the array of processor nodes 140.

In one embodiment, each task in a block is programmed in "C" and "Stretch-C," a programming language for software extensible instructions from Stretch, Inc. of Mountain View, Calif. The communication bandwidth is then allocated for communications between the tasks. The tasks are then placed onto an array of processor nodes 140. The channels for communications between the processor nodes are routed. The embedded applications depicted in FIG. 4 are then ready for execution.

The tasks communicate through channels. A channel is a form of communication that is uni-directional from one task to another. In some embodiments, the channels deliver data in order as in a FIFO. A channel can also have requirements and limits that control the performance of the channel.

Figure 5:
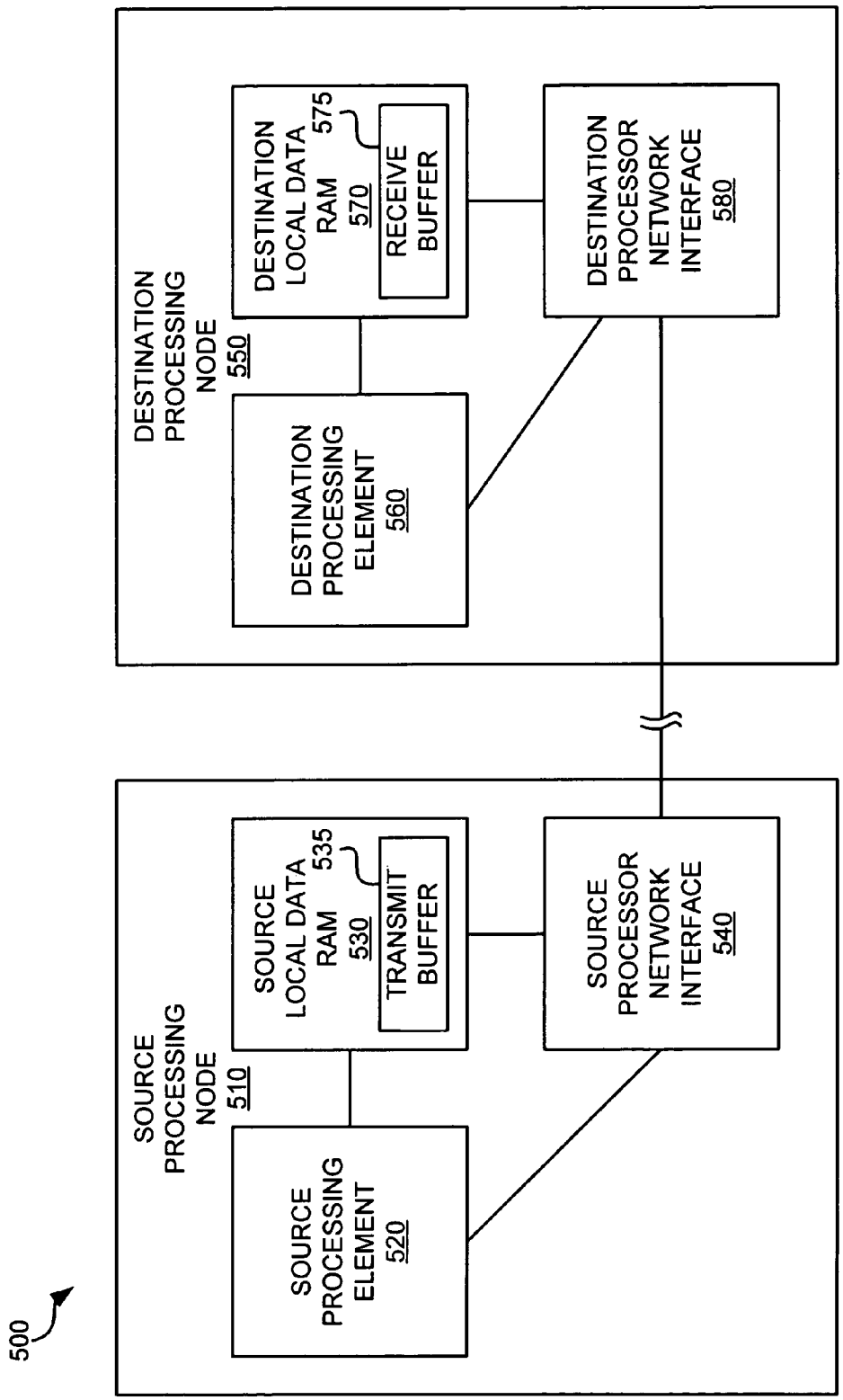
FIG. 5 is a diagram of a system for communicating between processing nodes in an exemplary implementation of the invention.

FIG. 5 depicts a diagram of a system 500 for communicating between processing nodes in an exemplary implementation of the invention. The system 500 includes a source processing node 510 and a destination processing node 550. The source processing node 510 includes a source processing element 520, a source local data RAM 530, and a source processor network interface 540. The source local data RAM 530 includes a transmit buffer 535. The destination processing node 550 includes the destination processing element 560, the destination local data RAM 570, and the destination processor network interface 580. The destination local data RAM 570 includes a receive buffer 575. The source local data RAM 530 and the destination local data RAM 570 may include numerous buffers for sending and receiving but only one in each processing element is shown in FIG. 5 for the sake of simplicity and clarity.

The source processing element 520 is coupled to the source local data RAM 530 and the source processor network interface 540. The source processor network interface 540 is coupled to the source local data RAM 530 and the destination processor network interface 580. The destination processor network interface 580 is coupled to the destination local data RAM 570 and the destination processing element 560. The destination processing element 560 is coupled to the destination local data RAM 570.

The processing nodes, processing elements, local data RAMs, and processor network interfaces correspond to respective similar components described in FIG. 2. In some embodiments, the source processing node 510 and the destination processing node 550 may or may not be adjacent to each other. Various components and links included within and between the source processing node 510 and the destination processing node 550 are not depicted in FIG. 5 to focus on the communications between the source processing node 510 and the destination processing node 550 using channels. For example, processor network switches and intermediate processing nodes are not shown in FIG. 5.

In one example, the source processing node 510 executes the code for the video input interface of FIG. 4, while the destination processing node 550 executes the code for the MPEG2 video encoder of FIG. 4. The video interface and the MPEG2 video encoder communicate through a channel as represented by an arrow in FIG. 4.

Figure 6:
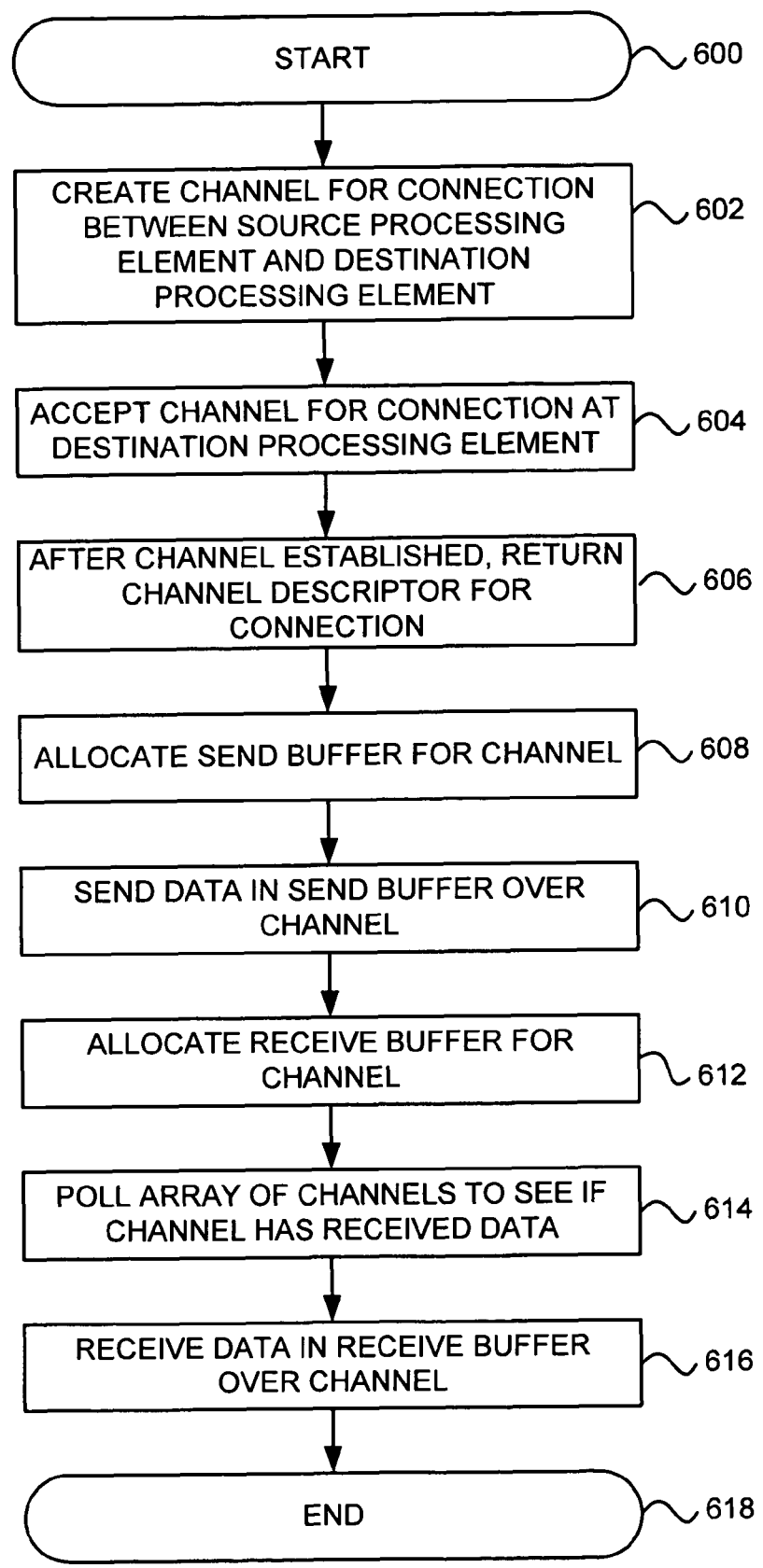
FIG. 6 is a flow chart for communications using channels between a source processing node and a destination processing node in an exemplary implementation of the invention.

FIG. 6 depicts a flow chart for communications using channels between a source processing node 510 and a destination processing node 550 in an exemplary implementation of the invention. FIG. 6 begins in step 600. In step 602, the source processing element 520 creates a channel for a connection to the destination processing element 560. In some embodiments, the channel is associated with a port, which is a unique identifier for the channel, in the source processing element 520. In one embodiment, the port is at most 16 bits. When creating a channel, the number of buffers and maximum size of the buffers may also be specified. In one embodiment, the number of buffers is less than 16 and the size of each buffer is less than 65536 bytes. In some embodiment, the total buffer space, which is the number of buffers times the maximum size of the buffer, should fit in the source local data RAM 530. If the channel has bandwidth requirements, the source processing element 520, the destination processing element 560, and intermediate resources, including processor network switches and intermediate processing nodes, are reserved to provide the bandwidth requirements. A channel may not be created due to an absence of available channels or insufficient buffer space in the source processing node 510 or the destination processing node 550.

In step 604, the destination processing element 560 accepts the channel for a connection to the source processing element 520. A port may also be specified for the channel in the destination processing element 560. In some embodiments, functionality called wild cards provides flexibility for accepting any connection. If a port is specified without a source processing element 520, then the destination processing element 560 accepts any connection over the port. If the source processing element 520 is specified without a port, the destination processing element 560 accepts any connection from the source, processing element 520.

In step 606, after the channel is established, the destination processing element 560 returns a channel descriptor for the connection. In step 608, the source processing element 520 allocates the transmit buffer 535 for the channel. This allows programmers to control the size of buffers on both the sending processing node 510 and the destination processing node 550.

In some embodiments, the source processing element 520 waits until the transmit buffer 535 becomes available for the channel. The source processing element 520 can then read or write the memory of the transmit buffer 535. In some embodiments, the setup of the channel in steps 602 to 606 occurs at the start of the task execution. For embedded application, channels are mostly static because the tasks and communications are relatively stable as compared with general purpose applications.

In step 610, the source processing element 520 executes a send command to send the data in the transmit buffer 535 to the destination processing element 560. The source processor network interface 540 performs the transmission of the data from the transmit buffer 535 to the destination processing element 560. The dedicated hardware of the source processor network interface 540 and the other components between the source processing element 520 and the destination processing element 560 advantageously transmit the data without burdening the source processing element 520 or the destination processing element 560 with consuming processor cycles to transmit the data. While the communication occurs in the background through dedicated hardware, the source processing element 520 can then continue executing other instructions for the task. Therefore, only a few processor cycles are consumed by the source processing element 520 in a send operation without consuming multiple processor cycles for the actual transmission of the data. After transmission, the transmit buffer 535 can be freed for other uses.

In step 612, the destination processing element 560 allocates the receive buffer 575 for the channel. In step 614, in some embodiments, the destination processing element 560 polls all the channels to check if the channel has received data. If data has been received, the data is returned to the destination processing element 560.

In step 616, the destination processing element 560 receives the next receive buffer 575 in the channel. A pointer to the receive buffer 575 may be returned to the destination processing element 560. In some embodiments, the destination processing element 560 frees the buffers for the channel. In some embodiments, the destination processing element 560 waits until data in a buffer is received. In some embodiments, the receive time (the time for a receive call assuming the data is available locally) is O(1) or in the constant order, where the receive time does not depend on the size of the message. With the receive time being in constant order, the programming is simplified. For example, a programmer may send whatever buffer size through the channel that is natural to the algorithm in the application. FIG. 6 ends in step 618.

A source processing element 520 may also destroy a channel. When the source processing element 520 destroys a channel, the channel enters a pending destroy state where the source processing element 520 may not allocate buffers to the channel or send data through the channel. Also, the destination processing element 560 should also finish receiving all pending buffers for the channel and acknowledge the destroy operation. Once the pending destroy state is complete, both the source processing element 520 and the destination processing element 560 close the channel.

Exemplary pseudo-code (e.g., C language) for the sending processor node and the receiving processor node is described in U.S. Provisional Application Ser. No. 60/459,538 titled "Method and Apparatus for an Array of Software Extensible Processors," filed Mar. 31, 2003. In some embodiments, channel creation takes some time relative to other multiprocessor functions because the OS is involved in establishing a channel before any other kind of resource is allocated.

The same programming model for communications between tasks can also be applied to memory operations. Instead of performing a send and receive for communications, a write and read can be performed for memory operations.

Figure 7:
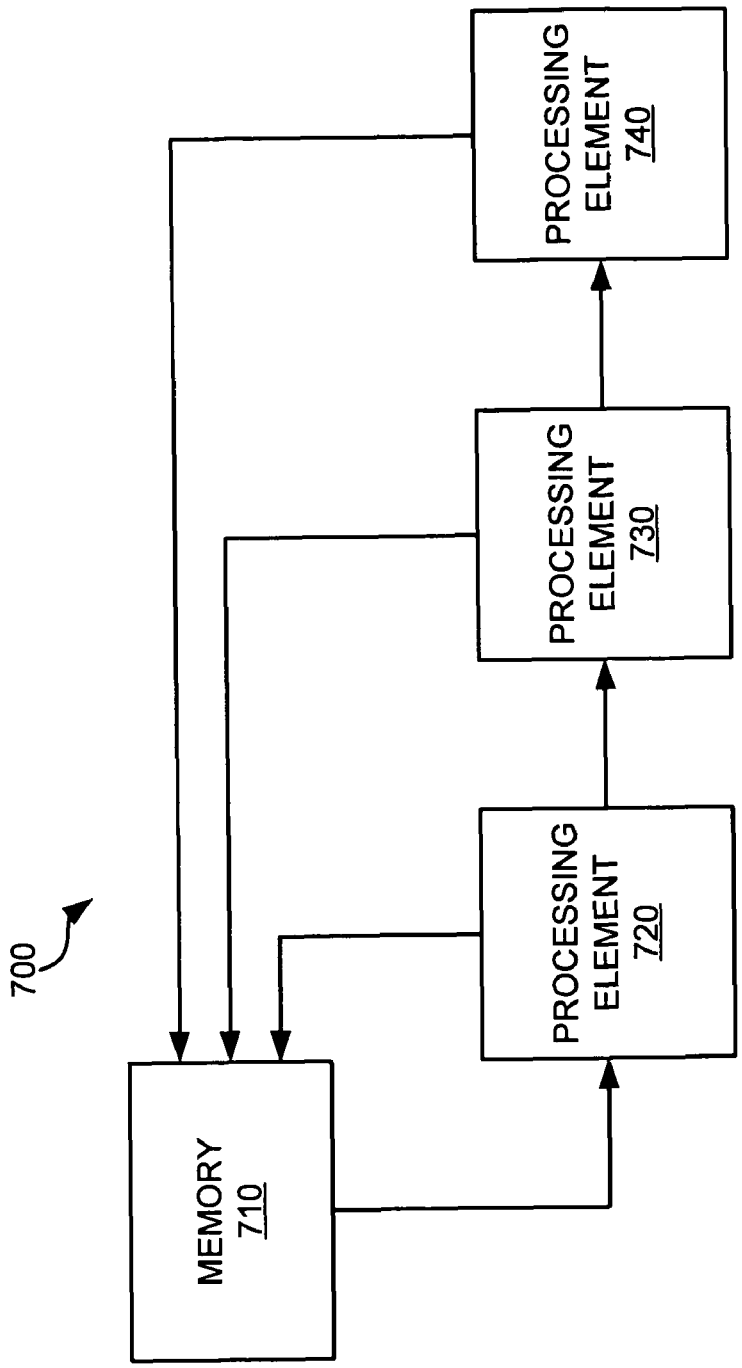
FIG. 7 is a diagram of processing elements and memory illustrating memory operations in an exemplary implementation of the invention.

FIG. 7 depicts a diagram of processing elements and memory illustrating memory operations in an exemplary implementation of the invention. The system 700 includes a memory 710, a processing element 720, a processing element 730, and a processing element 740. The processing element 720 reads data from the memory 710. The processing element 720 then performs operations on the data and stores the results in the memory 710. The processing element 720 may also transmit some of the results to the processing element 730. FIG. 7 shows how the passing of data from a processing element to a memory is similar to passing data to another processing element. Therefore, the programming model as described above can also be applied to read and write operations for memory.

In some embodiments, memory such as DDR and FLASH memory can be shared by all processors in the system as shared resources. This is called the global address space. Since there can be more than one DDR and FLASH memory in the system, each DDR and FLASH must be mapped to unique regions in this space. Therefore, every time a DDR or FLASH memory (or any other shared resource) is declared in the package description as described below, the address range in this global shared space is specified.

In some embodiments, a network interface memory management unit (MMU) provides the ability to arbitrarily map any memory location on any processing node to any other node. In one embodiment, the network interface MMU includes a general purpose re-map table, which is indexed by the top 16-bits of an address. The address generated by the processor is first run through the network interface MMU. If there is a match, the table entry holds the processor node ID and the top 16-bits of the address at that processor node.

On the other hand, each processing node has data RAM. In some embodiments, each processing node has peripherals that are not shared with other processors (local resources). The local address space can be broken into mappable memory and unmappable memory. The unmappable portion of the address space is left for devices that are not shared with other processing elements, which include the data RAM, and peripherals such as gigabit media access control (GMAC), PCI, time division multiplexing (TDM), etc. Therefore, each time a processing element is declared in the package description as described below, the mapping from its local to global address space is specified.

Having shared regions of memory may be helpful in many situations besides communications. In one example, a large voice recognition file is shared by many tasks that each perform voice recognition. Some embodiments include smart data structures that keep track of tasks sharing the data. Therefore, in the voice recognition example, when there are changes to the voice recognition file, the tasks using the voice recognition file may be identified and then notified of the changes using smart data structures.

In some embodiments, channels provide guaranteed bandwidth. The hardware, such as the processor network interfaces and the processor network switches, will then guarantee that the amount of bandwidth is always available. The bandwidth is then reserved and not available for other uses. For many embedded applications, it is very useful to be able to guarantee the communication bandwidth between two nodes. In the case of video compression (or decompression), for example, it is useful to be able to guarantee the bandwidth required for the uncompressed video. If the machine cannot deliver the required bandwidth, the quality of the image will suffer.

In one embodiment, the hardware guarantees communication bandwidth by using time division multiplexing (TDM). This is similar to the bandwidth allocation used in the switched phone network but has not been applied as the communication medium for a multi-processor network. In TDM, time is first divided into "slots" (or timeslots) with N timeslots per period. During each timeslot, each link is pre-allocated to a particular connection (channel). Furthermore, the connections of each link are pre-determined to enable the connections of links across time.

Figure 8:
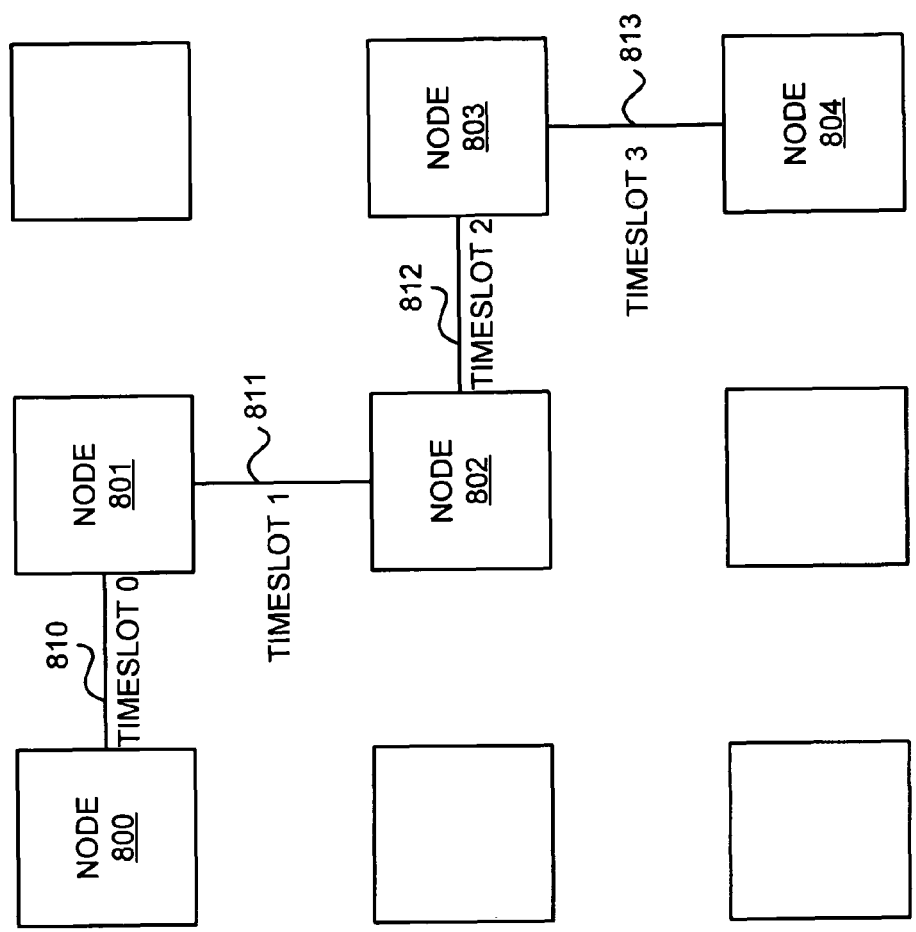
FIG. 8 is a diagram of an array of processor nodes using time division multiplexing in an exemplary implementation of the invention.

FIG. 8 depicts a diagram of an array of processor nodes using TDM in an exemplary implementation of the invention. In FIG. 8, a channel carries data from node 800 to node 804. The data first travels at timeslot 0 from node 800 to node 801 via link 810. At timeslot 1, the switch (not shown) at node 801 takes one cycle to pass the data on link 811. At timeslot 2, the link 812 then carries the data to node 803. Finally, at timeslot 3, the link 813 carries the data travels to node 804. Thus, a connection from a source node to a destination node can be built by pre-allocating link and switch bandwidth to each connection between the intervening nodes. In some embodiments where applications are static, the place and route problem is solved only once.

Routing the set of channels in an application consists of a maze router in three dimensions. Each level of the maze corresponds to a particular timeslot. Data moves vertically when it arrives at a switch and is held for a cycle. In some embodiments, no control information is routed along with the data. In these embodiments, assuming that the network has been set up correctly, the data simply arrives at the destination node. This requires that all nodes be synchronized in time.

TDM can be implemented using a table with one entry per timeslot. This table indicates the connections that should be enabled in the crossbar (i.e. which egress port to use for each ingress port). A counter keeps track of the current timeslot and is used to select an entry in the table.

TDM can be thought of as virtually partitioning the bandwidth of the link into individual "virtual wires." If there are 128 timeslots in a period and 128-bits in each link, then each timeslot corresponds to a dedicated 1-bit virtual wire.

A related, alternative implementation of guaranteed bandwidth is the concept of bundling, which is also called spatial division multiplexing. Bundling is the spatial equivalent of time division multiplexing. That is, rather than allocating bandwidth by dividing time it allocates bandwidth by dividing the individual wires in the link.

If each link consists of 128 wires, the link can be divided into 128 individual "bundles." This concept is referred to as bundles because more than one wire can be used for each connection (for example, some connections could have 4 or 8 wires). Each wire is then dedicated to a particular connection and cannot be shared in time. One advantage of bundles over TDM is that global time synchronization is not required. Data will simply travel down the wire and eventually be received at the destination.

Figure 9:
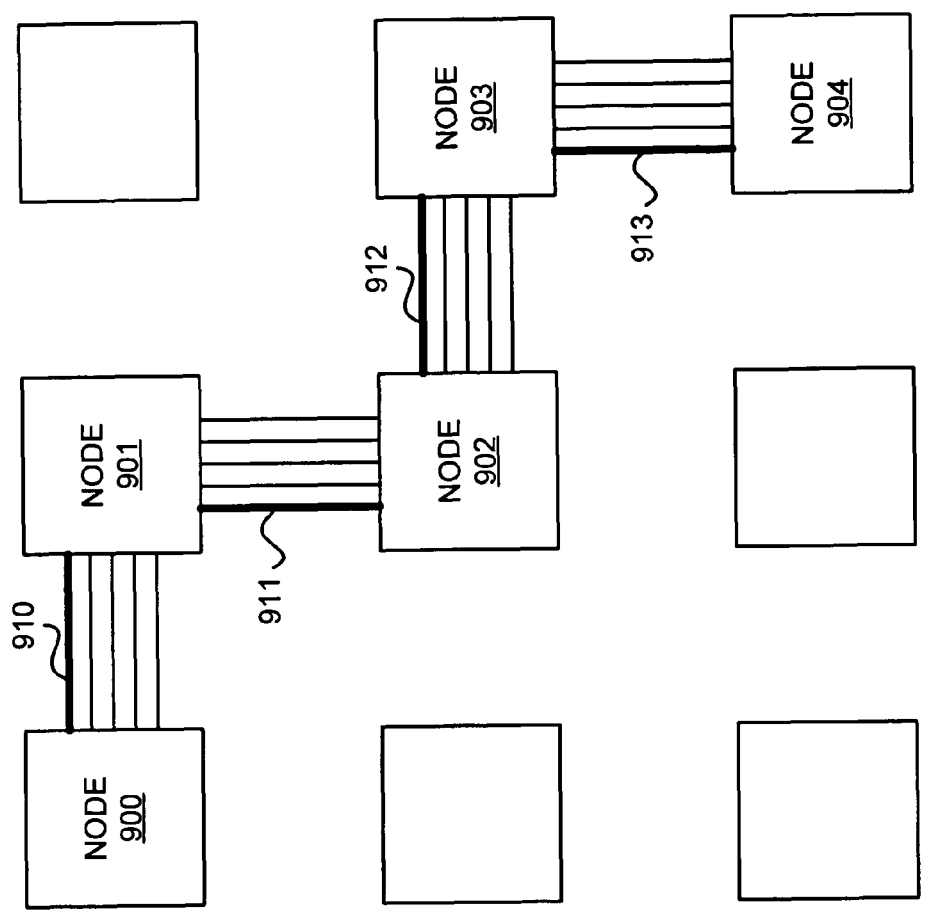
FIG. 9 is a diagram of an array of processor nodes using bundling in an exemplary implementation of the invention.

FIG. 9 depicts a diagram of an array of processor nodes using bundling in an exemplary implementation of the invention. FIG. 9 shows a simple example of an array connected by bundles (where one bundle 910-913 shown in bold is used to connect node 900 and node 904). With bundles, the complexity of the switch increases since it must be able to switch every bit individually. Furthermore, more hardware is required at the network interface to slowly insert a 64 or 128-bit quantity into a 1, 2, or 4-bit "wire." This limits how many connections can be active at once.

Figure 10:
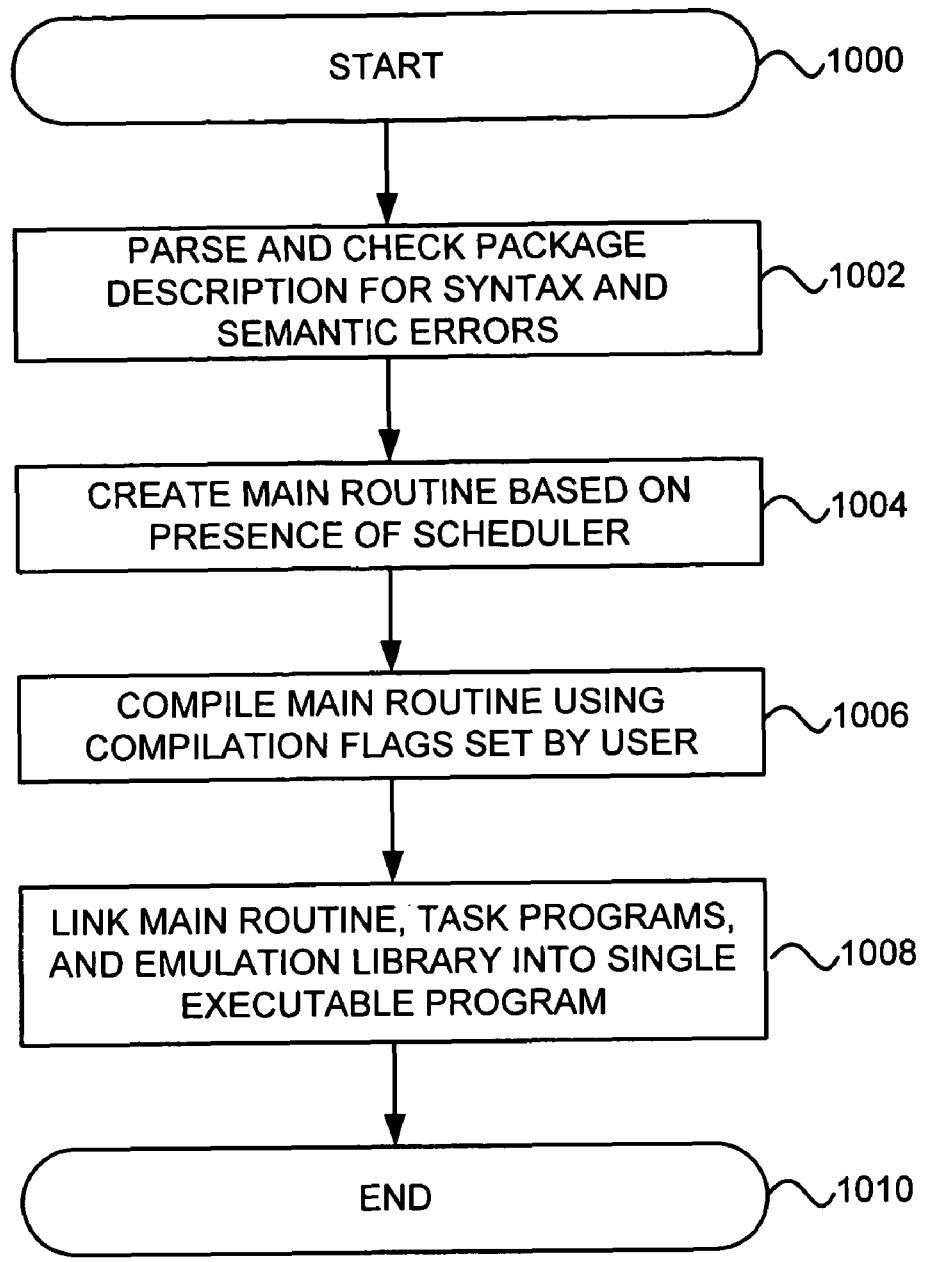
FIG. 10 is a flow chart for a package compiler for compiling for a host in an exemplary implementation of the invention.
Figure 11:
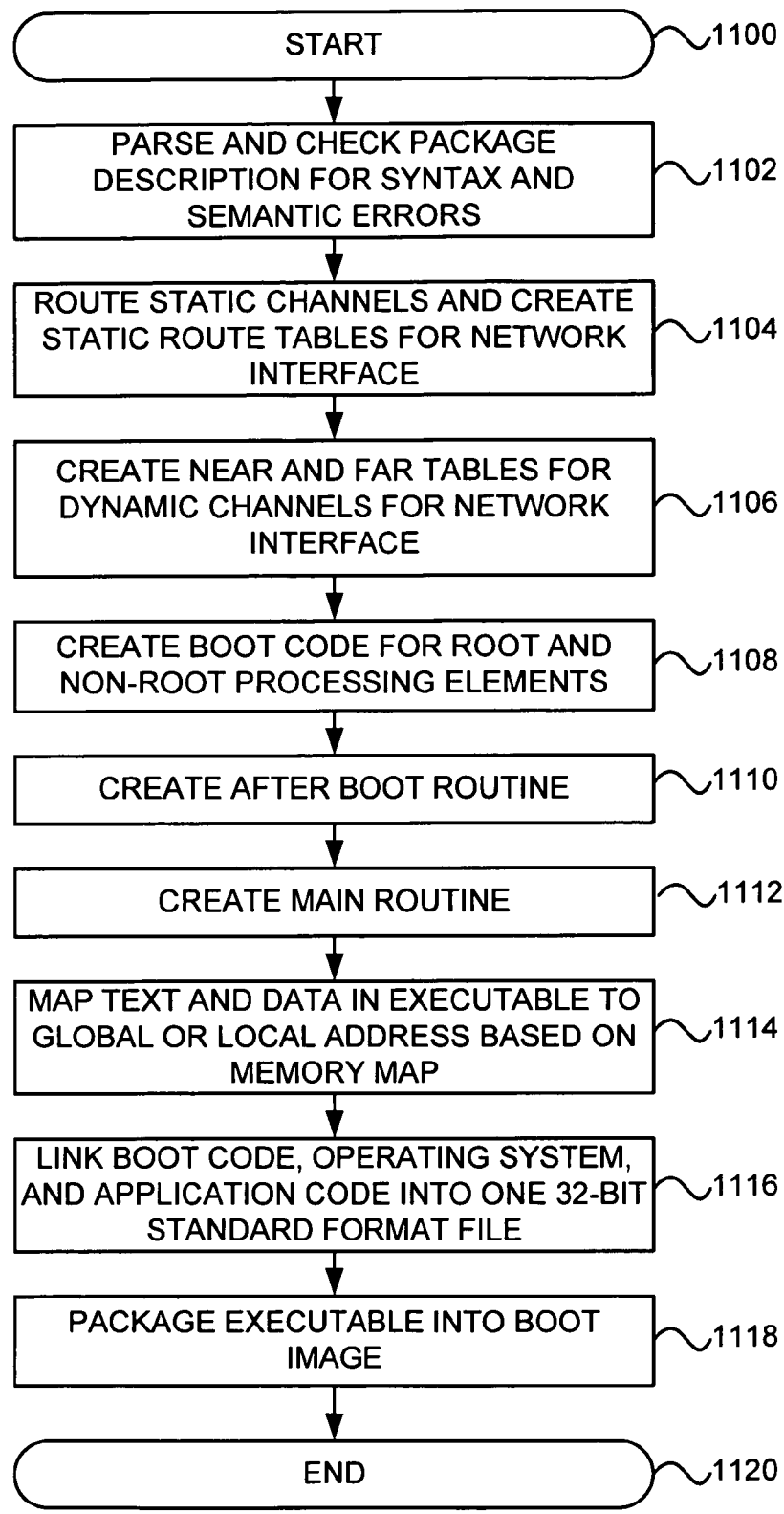
FIG. 11 is a flow chart for a package compiler for compiling a task for a processing node in an exemplary implementation of the invention.

Package Compiler—FIGS. 10-11

After the tasks and communications between the tasks are defined, a package compiler compiles a package description into executables for the group of processing nodes to run. A package description is an application description and a physical description of a group of processing nodes. In one embodiment, the package description is in Extensible Markup Language (XML) format. There are various formats the package specification can be in. Preferably, the format of the package description should be easy to use, easy to write parsers and analyzers for, and be fairly intuitive to a user.

The physical description includes the composition and layout of the group of processing nodes. In one example, the physical description includes for each processing element, the processing element number, the orientation, the number of neighboring processing elements, the peripherals connected to the processing element, and a flag indicating whether the processing element is the root processing element. From a physical description such as this example, the topology of the processing nodes can be determined. There are numerous variations and combinations of definitions, maps, and topologies of the processing nodes that can be used to determine the physical description.

The application description is the description, definitions, files, settings, and parameters related to how an application runs on the processing nodes. Some examples of the application description include a set of tasks, the code for each task, task assignment, how tasks communicate via channels, which channels are static or dynamic, and what debug or trace information is required.

In one embodiment, the application description includes an archive file (.a) or an object file (.o) for the task that have been previously compiled into machine instructions. In this embodiment, the application description also may include the code size, the average, minimum, and maximum cycles consumed by the task, and the parameter for invocation of the instance of the task. The application description may also include the processing element on which the task runs, the priority of the task on the processing element, the average number of invocations per second, and where sections of text and data map to in the global and local address space. The application description may also include the scheduling algorithm to use for the processing element such as round-robin, static priority-based, or dynamic priority-based. In some embodiments, the application description includes the local address to global address map.

The application description may also include channel information such as the channel name, the source task and port number, the destination task and port number, a flag to indicate whether the channel is statically routed or dynamically routed, the channel's typical, minimum, maximum bandwidth requirements, route of the channel, number and description of shared memory regions in the system, I/O requirements for each task, and the debugging and tracing information.

The process of mapping the application to the processor array is the process of assigning tasks to the appropriate processing element. This process of mapping can be performed either manually or automatically. Once the size of the array, its topology, and an assignment of tasks to processing elements are decided, the package description is created with detailed information about the array and the tasks. In some embodiments, the package compiler converts the package description into a program that runs on a host (Linux or Windows box) for emulation to assist with the mapping. This program allows the designer to debug the task decomposition and communication and establish system functionality.

FIG. 10 depicts a flow chart for a package compiler for compiling for the host in an exemplary implementation of the invention. FIG. 10 begins in step 1000. In step 1002, the package compiler parses and checks for syntax and semantic errors in the package description. In step 1004, the package compiler creates a main routine based on the presence of a scheduler for applications. If the scheduler is present, the package compiler initializes an emulation library and the emulation versions of the static and dynamic routing tables. The package compiler then forks threads for each task instance. The main process then goes to sleep. If a processing element does not run a scheduler, the package compiler initializes the emulation versions of static and dynamic routing tables. The main task for the processing element is then called.

In step 1006, the package compiler compiles the main routine using compilation flags set by the user such as -g or -O. In step 1008, the package compiler links the main routine, the task objects such .o's or .a's, and the emulation version of the operating system library into a single executable. This executable can then be run on the host machine. The source code for the main routine is also available for debugging purposes. FIG. 10 ends in step 1010.

The package description can be updated based on the results of the emulation. The package compiler then uses the updated package description to generate an executable that be run on the hardware or a simulation of the hardware. The following discussion for FIG. 11 relates to the embodiments for the package compiler in generating executable code. In some embodiments, the package compiler creates code that is executed on an actual board of processing nodes. In these embodiments, the package compiler creates the final ROM-able image that will be stored in a FLASH memory. In some embodiments, as specified, the processor array has a single address space that all processors see, and there is one executable for the array. In some embodiments, all processing elements execute the same boot code and the same OS code, but each processing element executes only selected application routines that correspond to tasks mapped to that processing element.

In some embodiments, the package compiler creates code that is executed on a hardware simulator for simulation. An executable running on a simulator may have a different boot mechanism whereby the post-boot state of each processor node is magically set and the lengthy boot sequence is skipped. For simulation, the tasks doing input/output functions use file descriptors. In some embodiments, the task is refined into a set of tasks that access the appropriate device and sets up a DMA into or out of the buffer where the computation task expects or puts the data.

This simulation may be used to estimate performance. Cycles used to execute tasks on the host can be used in conjunction with a rough scaling factor to determine cycles on the processing element. This will allow the designer to break up tasks if too big and determine which tasks can be run on the same processing element. Additionally, the effect of the ISEF can be roughly estimated by scaling the cycle counts for the functions implementing the extension instruction and using the extension instruction. In creating the executable for the host, the package compiler uses a simulation version of the communication library, the boot code, and the operating system scheduler. Both the emulation and simulation processes can be repeated to achieve the optimum performance of the application or the optimum configuration of the system executing the application.

FIG. 11 depicts a flow chart for a package compiler for compiling the task for processing node in an exemplary implementation of the invention. FIG. 11 begins in step 1100. In step 1102, the package compiler parses and checks for syntax and semantic errors in the package description. In step 1104, the package compiler routes the static channels and creates the data for the static route tables for the network interface associated with each processing element. In step 1106, the package compiler creates near and far tables for dynamic channels for the network interface associated with each processing element. In one embodiment, Dimension Order routing algorithm is used for the far tables. The near table may include routes to the DDR for serving cache misses.

In step 1108, the package compiler creates boot code for root and non-root processing elements. The boot code for root and non-root processing elements are discussed in further detail below in FIGS. 12-15.

In step 1110, the package compiler creates an after boot routine for each processing element. In one embodiment, the after boot routine sets the scheduling policy and initializes the scheduler. The after boot routine initializes I/O devices if any. The after boot routine also initializes the malloc data structures. Two types of malloc are one for allocation in the local Data RAM and the other for allocation in the global DDR space. The after boot routine may also create the tasks for a specific processing element and put the tasks in the scheduler task queue. If there is a scheduler, the after boot routine transfers control to the operating system scheduler and starts the execution of the tasks.

In step 1112, the package compiler creates a main routine. In this main routine, the processing element number of the processing element running the code is determined. Then, the processing element executes the main routine for that processing element number. Therefore, each processing element will only execute the main routine for the corresponding processing element number that was created specifically for that processing element.

In step 1114, the package compiler maps each section of the text and data in the executable to a global or local address based on the memory map provided in the package description. The package compiler also generates the linker script. In one embodiment, the linker script is for an Xtensa linker (xt-ld). In some embodiments, in order to save debug time, the package compiler performs consistency checking to ensure that a task running on the processing element has its section mapped to the portion of the DDR that is accessible from that processing element. In step 1116, the package compiler links the boot code, the operating system, and the application code into one standard format file by calling xt-ld. In one embodiment, the standard format file is a 32-bit Executable and Linking Format (ELF) file.

In step 1118, the package compiler packages the executable into a boot image. In one embodiment, the package compiler compresses the image to fit in a small ROM. Also, the package compiler adds a simple boot monitor to the executable to provide instructions on how to unpack the executable and where to load the executable. This simple boot monitor may also have a basic Joint Test Action Group (JTAG) boot code for the entire system. FIG. 11 ends in step 1120.

In some embodiments, the process of assigning tasks to the processor nodes and allocating channel bandwidth is automated. Initially, a best guess package description is created. The package compiler then compiles this package description. The executable runs to create performance data. The package compiler then takes the old package description and the performance data and creates a new package description. These steps can be repeated until the optimum performance of the application is achieved or until the designer of the application is satisfied with the performance.

Boot Process—FIGS. 12-15

After compilation of the package description and before execution of the user application, the group of processing nodes needs to be booted to an initialization state. Components such as memories, caches, registers network interfaces, communications, and switches need to be initialized before execution of the user application. Depending on the mapping of the application to the processing nodes, either a single processor or multiple processors needs to be booted for initialization.

Figure 12:
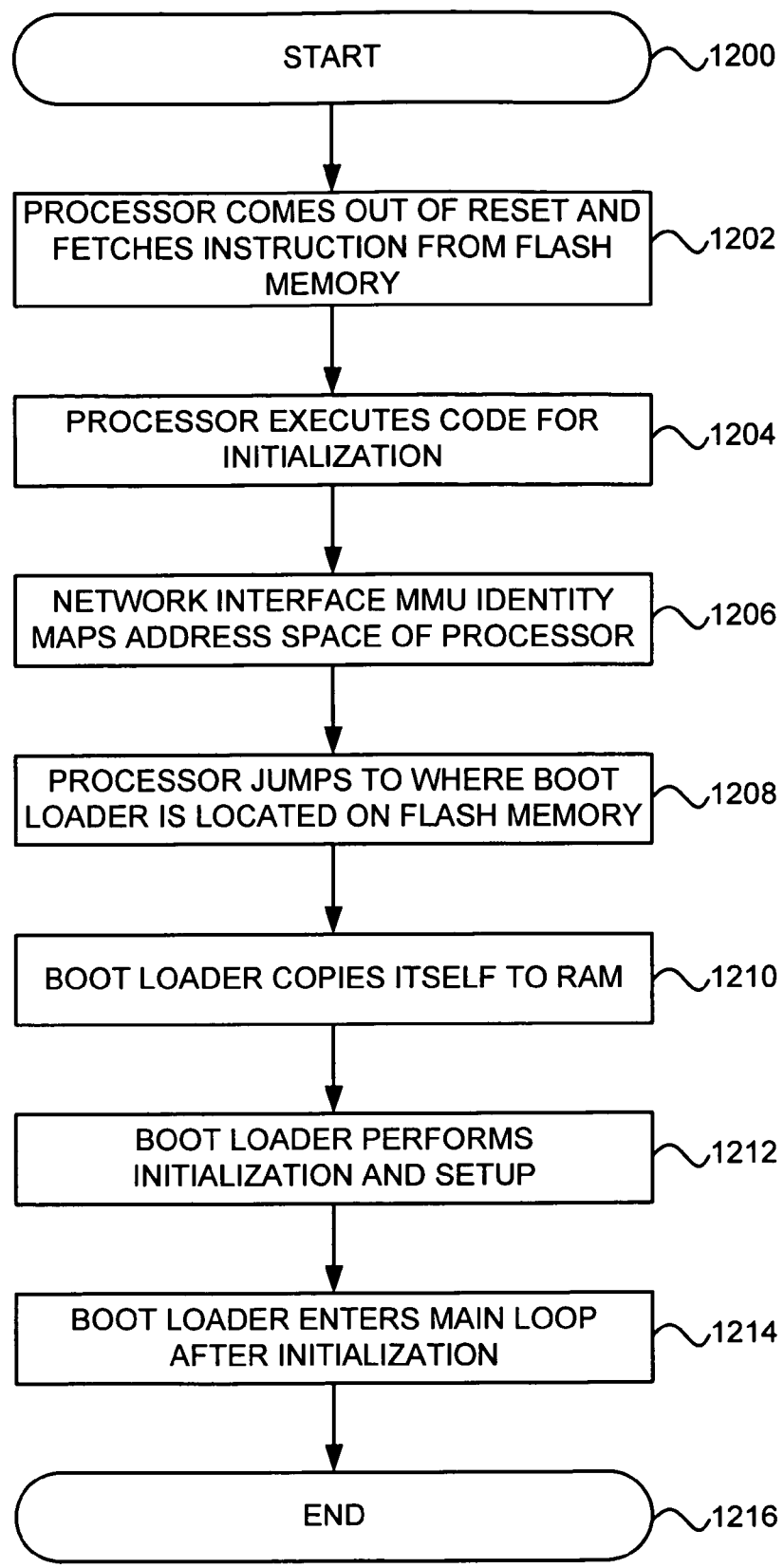
FIG. 12 is a flow chart for booting a processing element in single processor mode in an exemplary implementation of the invention.

FIG. 12 depicts a flow chart for booting a processing element in single processor mode in an exemplary implementation of the invention. In this single processor mode, the processing element is "processor array agnostic" and assumes that it is the only processing element in the system. FIG. 12 begins in step 1200. In step 1202, the processing element comes out of reset and fetches instructions from the FLASH memory. In step 1204, the processing element executes code for initialization of the processing element. The initialization of the processing element is described in further detail below in FIG. 13. In step 1206, the network interface memory management unit (MMU) identity maps the entire address space of the processing node. In step 1208, the processing element jumps to where the boot loader code is located in the FLASH memory.

In step 1210, the boot loader copies itself to the RAM. In one embodiment, the boot loader is Redboot, the Red Hat Embedded Debug and Bootstrap firmware. In some embodiments, the boot loader copies itself to the DDR region of the address space or to the SRAM region. The boot loader then jumps to the address in the RAM where it copied itself over. In step 1212, the boot loader performs initialization and setup work, which includes setting up stack frames to enable execution of C code. The driver and initialization routines that are written in C are executed to initialize GMAC, PCI, UART, and other components.

In step 1214, the boot loader enters its main loop after initialization. In this step, a user may through a console and UART enter boot loader commands to peek or poke memory, peripheral registers, or any other component in the system. FIG. 12 ends in step 1216.

In one embodiment, an operating system such as Monta Vista Linux can be booted as well. Booting the Linux operating system is similar to the steps of FIG. 12. However, in step 1214, the user enters a command to load the Linux image into memory using an IP address of where the Linux image is stored. The Linux image is transferred by file transfer protocol and then loaded into memory. The Linux image then unpacks itself and proceeds to the Linux kernel. The Linux kernel then mounts a file system from a file server such as a NFS server. The Linux kernel then provides a login prompt for users to login to for access to the machine.

Figure 13:
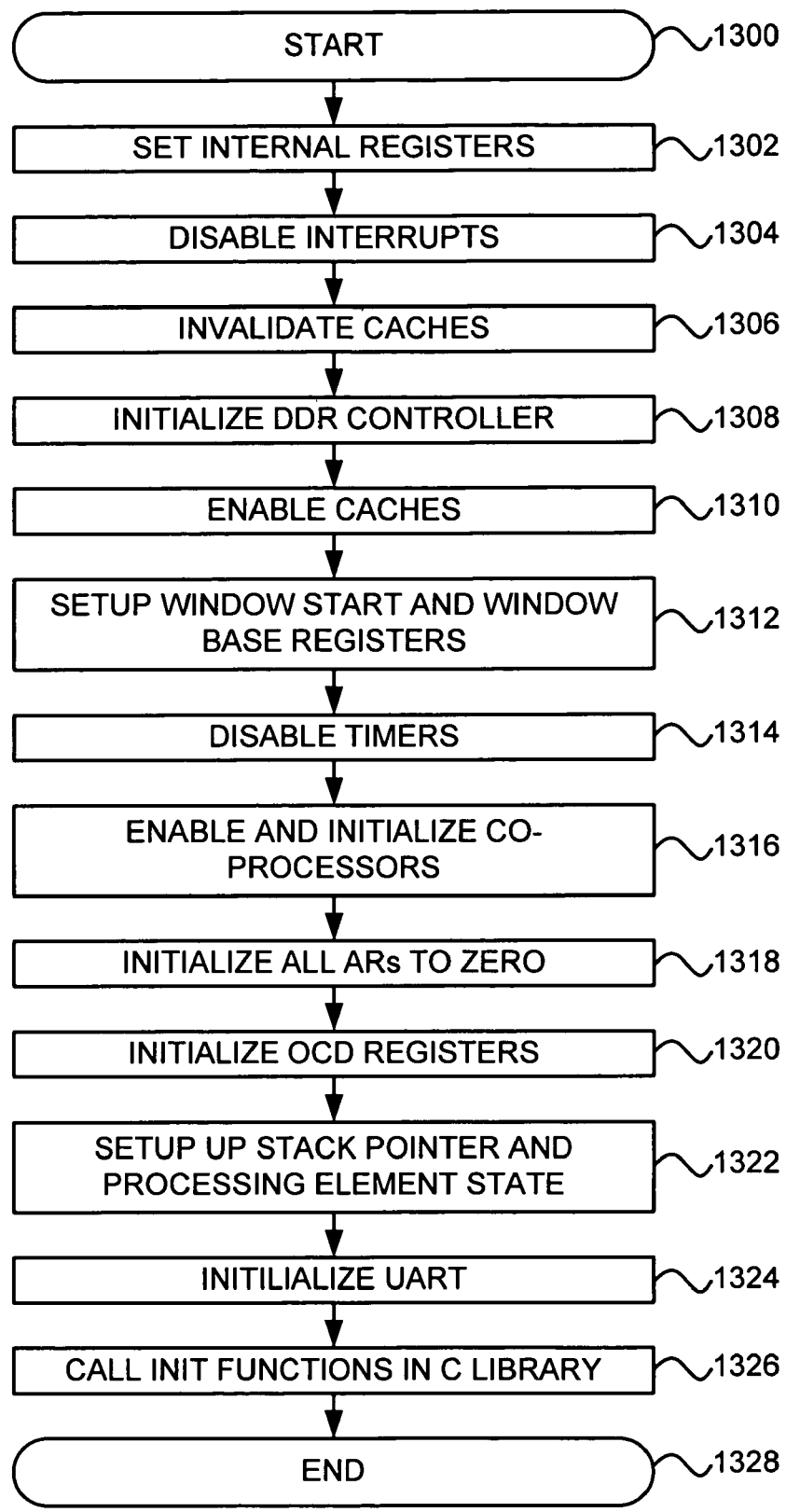
FIG. 13 is a flow chart for initializing a processing element in an exemplary implementation of the invention.

FIG. 13 depicts a flow chart for a processing element initialization in an exemplary implementation of the invention. FIG. 13 begins in step 1300. The processing element comes out of a reset state and executes reset code. In one embodiment, the reset code is an Xtensa-specific reset code. In step 1302, the processing element sets various internal registers such as the breakpoint register and shift amount register. In step 1304, the processing element disables interrupts. In step 1306, the processing element then invalidates the caches. In step 1308, the processing element then initializes the DDR controller. In step 1310, the processing element enables the caches.

In step 1312, the processing element sets up the window start and the window base registers. In step 1314, the processing element disables the timers. In step 1316, the processing element enables and initializes any co-processors if present. In step 1318, the processing element initializes all address registers (AR) to zero. In step 1320, the processing element initializes the On-chip Debug (OCD) registers. In step 1322, the processing element sets up the stack pointer and the processing element's state. At step 1324, C functions can then be run. In step 1324, the processing element initializes the UART. In step 1326, the processing element calls the init functions in the C library. FIG. 13 ends in step 1328.

In a multi-processor boot, one processor is designated as the root processor and the other processors are non-root processors. Each of the non-root processors may not have FLASH memory or other kinds of memory associated with it to hold boot code. Therefore, the boot code needs to be obtained by these non-root processors in order to boot properly. In one embodiment, a root pin is set to designate whether a processor is root or non-root. In one embodiment, the OCD Joint Test Action Group (JTAG) ports of the processors are connected in a daisy chain, where the root processor is attached to the head of the chain. The root processor may then drive the OCD JTAG chain of the slave (non-root) processors via software during boot and debug. In some embodiments, if the root pin is set where the processor is not the root, the non-root processor does not come out of reset until a specific command is received through the JTAG port.

Figure 14:
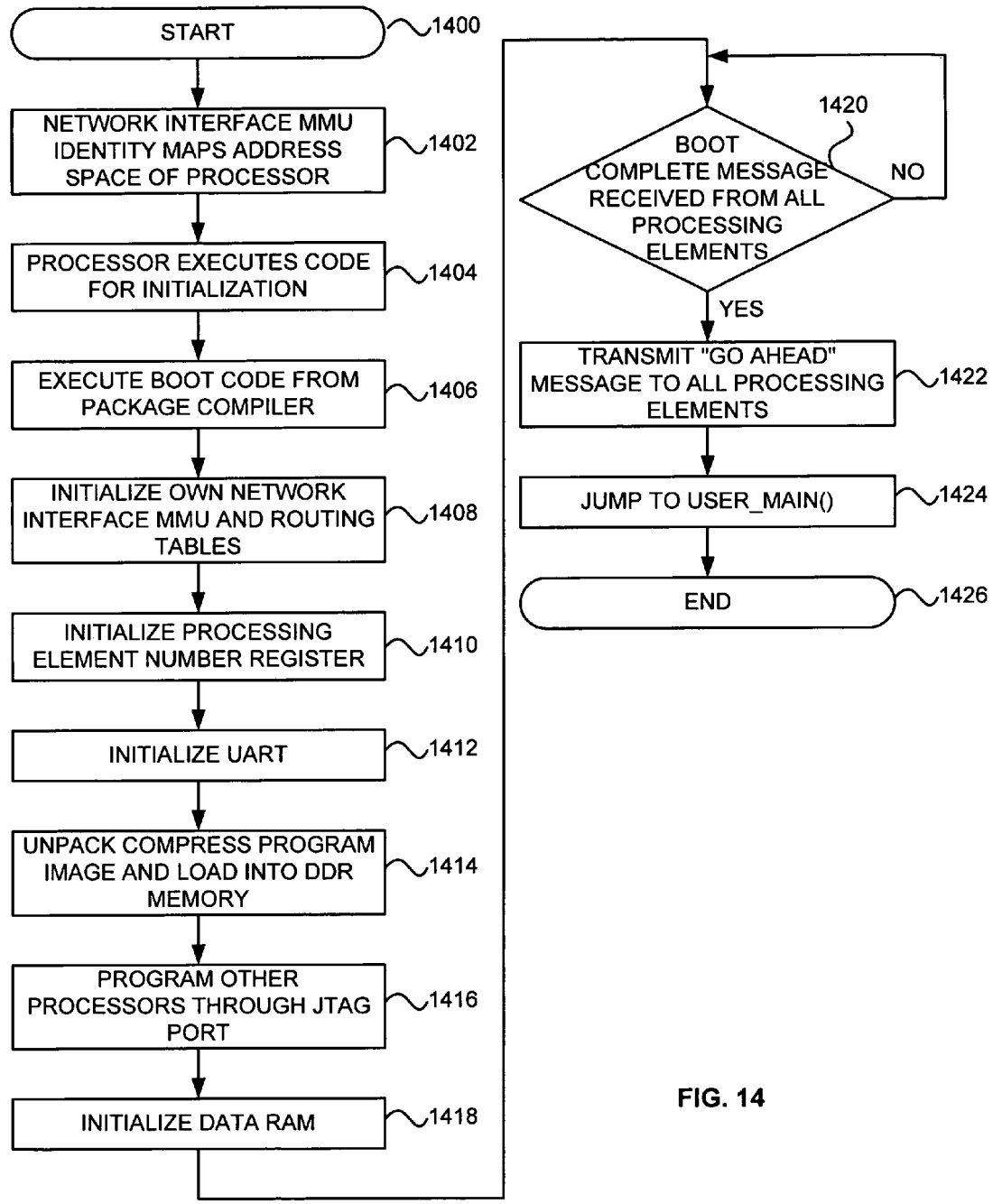
FIG. 14 is a flow chart for booting a root processing element in an exemplary implementation of the invention.

FIG. 14 depicts a flow chart for booting a root processing element in an exemplary implementation of the invention. FIG. 14 begins in step 1400. In step 1402, the network interface MMU identity maps the address space of the processing element. In step 1404, the root processing element executes code for initialization of the processing element. The steps for initialization of the processing element are discussed above in FIG. 13.

In step 1406, the root processing element then executes the boot code for the root processing element created by the package compiler. In some embodiments, the boot code includes the following six steps. In step 1408, the root processing element initializes its own network interface MMU and routing tables. In step 1410, the root processing element initializes its processing element number register. In step 1412, the root processing element initializes the UART. In step 1414, the root processing element unpacks the program image and loads the program image into the DDR memory.

In step 1416, the root processing element programs the other non-root processing elements through the JTAG port by performing the following. The root processing element transmits a boot message to indicate to the non-root processors to boot and how to boot. One example of the boot message is a JTAG command. The package compiler determines the value of the processing element number register, network interface MMU, and static and dynamic routing table entries for each processing element. The package compiler combines these entries with the appropriate JTAG commands needed to set the various tables, and stores the commands and entries into a large memory array. The root processing element copies this entire array into a JTAG register, one entry at a time. Therefore, the tables of all the processing elements get set. In step 1418, the root processing element initializes the data RAM.

After the boot code executes, the root processing element waits for boot complete messages from all non-root processing elements in step 1420. If boot complete messages have not been received from all non-root processing elements, the root processing element continues to wait in step 1420. If boot complete messages have been received from all non-root processing elements, the root processing element transmits a "go ahead" or proceed message to all processing elements to proceed executing the user_main( ) routine, which is the entry point for the user application. In step 1424, the root processing element jumps to user_main( ) FIG. 14 ends in step 1426.

Figure 15:
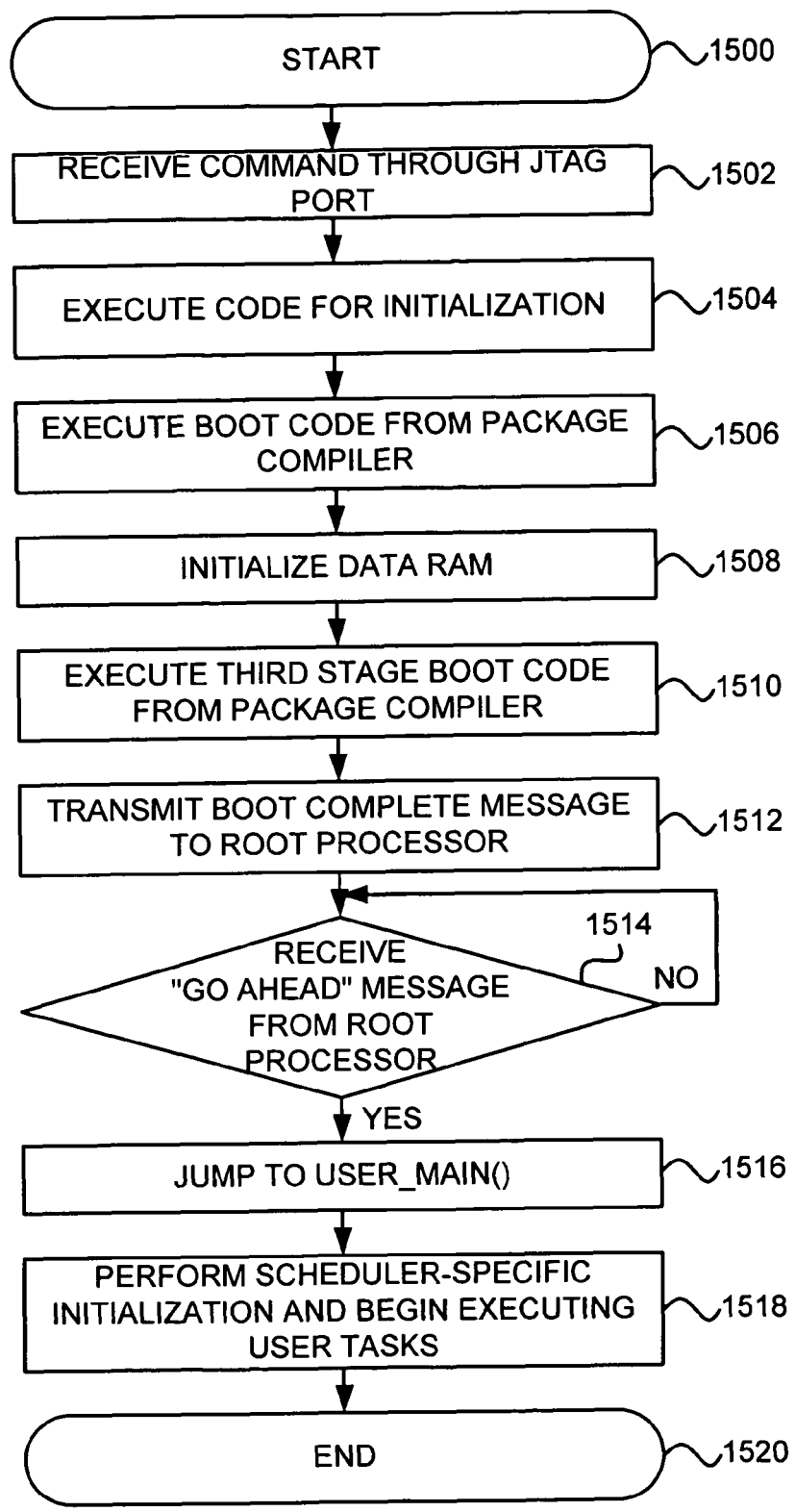
FIG. 15 is a flow chart for booting of a non-root processing element in an exemplary implementation of the invention.

FIG. 15 depicts a flow chart for booting of a non-root processing element in an exemplary implementation of the invention. FIG. 15 begins in step 1500. In step 1502, the non-root processing element receives a command or boot message through the JTAG port. In step 1504, the non-root processing element executes code for initialization of the processing element. The steps for initialization of the processing element are discussed above in FIG. 13.

In step 1506, the non-root processing element executes the boot code from the package compiler. In some embodiments, the boot code includes the following step. In step 1508, the non-root processing element initializes the data RAM.

In step 1510, the non-root processing element executes the third stage boot code from the package compiler. In some embodiments, the boot code includes the following four steps. In step 1512, the non-root processing element transmits a boot complete message to the root processing element. In step 1514, the non-root processing element checks whether a "go ahead" message is received from the root processing element. If the "go ahead" message has not been received from the root processing element, the non-root processing element continues to wait in step 1514. If the "go ahead" message has been received from the root processing element, the non-root processing element jumps to user_main( ) in step 1516. In step 1518, the root processing element performs scheduler-specific initialization and begins executing user tasks by executing pe_main( ) which is the entry point that is specific to each processing element. FIG. 15 ends in step 1520.

In some embodiments, the root and non-root boot code is combined into one program. In these embodiments, all processing elements execute the common sections of the boot code, while the appropriate processors execute the root and non-root specific sections.

Instead of using JTAG ports, an alternative embodiment includes a packet switch network for the processors nodes. The boot code is initially stored in a FLASH memory. A root processor adjacent to the FLASH memory retrieves the boot codes and executes the boot code. The root processor then transmits the boot code to adjacent non-root processors. The propagation of boot code continues over the packet switch network through all non-root processors until all non-root processors are booted.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of communicating data between a plurality of processing nodes within an array of processor nodes, the method comprising:
   determining a route for a unidirectional channel from a source processing node in an array of processing nodes having locations on one or more integrated chips on a printed circuit board to a destination processing node in the array of processing nodes, wherein the location of the source processing node relative to the location of the destination node is fixed during data transmission, the determined route based on a physical description of the array of processing nodes;
   generating the unidirectional channel along the determined route from the source processing node to the destination processing node, the channel having a bandwidth requirement;
   accepting the channel for unidirectional data transmission in the destination processing node;
   allocating a transmit buffer for the channel in the source processing node;
   allocating a receive buffer for the channel in the destination processing node;
   writing data from a source processing element to the transmit buffer;
   transmitting the data unidirectionally from the transmit buffer over the channel using a source network interface in the source processing node;
   receiving the data over the channel into the receive buffer using a destination network interface in the destination processing node; and
   reading the data from the receive buffer into the destination processing element.

2. The method of claim 1 wherein the unidirectional channel is associated with a first task executing on the source processing element and a second task executing on the destination processing element.

3. The method of claim 1 wherein the unidirectional channel is associated with a first port in the source processing element and a second port in the destination processing element.

4. The method of claim 1 wherein the unidirectional channel has a maximum number of buffers and size of buffers.

5. The method of claim 1 further comprising reserving intermediate resources for the unidirectional channel based on the bandwidth requirements.

6. The method of claim 1 further comprising guaranteeing bandwidth based on the bandwidth requirements using time division multiplexing.

7. The method of claim 1 further comprising guaranteeing bandwidth based on the bandwidth requirements using spatial division multiplexing.

8. The method of claim 1 further comprising polling a plurality of channels to check if data is received into the receive buffer for the unidirectional channel.

9. The method of claim 1 further comprising freeing the transmit buffer using the source processing element.

10. The method of claim 1 further comprising freeing the receive buffer using the destination processing element.

11. The method of claim 1 further comprising destroying the unidirectional channel.

12. The method of claim 1 further comprising receiving a pointer for the data in the receive buffer into the destination processing element and wherein reading the data from the receive buffer into the destination processing element is based on the pointer.

13. The method of claim 1 wherein a time for a receive call in the destination processing element does not depend upon a size of the data.

14. A multi-processor system comprising:
a source processing node, wherein the source processing node's location in an array of processing nodes is fixed relative to the location of a destination processing node during data transmission, the array of processing nodes being located on one or more integrated chips on a printed circuit board, the source processing node comprising:
a source processing element configured to generate a unidirectional channel, allocate a transmit buffer for the unidirectional channel, and write data to the transmit buffer for the unidirectional channel, and
a source network interface configured to transmit the data unidirectionally from the transmit buffer of the source processing node over the unidirectional channel; and
the destination processing node, wherein the destination processing node's location in the array of processing nodes is fixed relative to the location of the source processing node during data transmission, the destination processing node comprising:
a destination processing element configured to accept the unidirectional channel, allocate a receive buffer for the unidirectional channel in the destination processing node, and receive the data from the receive buffer,
a destination network interface configured to receive the data into the receive buffer for the unidirectional channel, and
the unidirectional channel having a bandwidth requirement and generated by the source processing element along a route, the route and the bandwidth requirement based on one or more tasks associated with the destination processing node.

15. The multi-processor system of claim 14 wherein the unidirectional channel is associated with a first task executing on the source processing element and a second task executing on the destination processing element.

16. The multi-processor system of claim 14 wherein the unidirectional channel is associated with a first port in the source processing element and a second port in the destination processing element.

17. The multi-processor system of claim 14 wherein the unidirectional channel has a maximum number of buffers and size of buffers.

18. The multi-processor system of claim 14 wherein the source processing node and the destination processing node are configured to reserve intermediate resources for the unidirectional channel based on the bandwidth requirements.

19. The multi-processor system of claim 14 wherein the source processing node is configured to guarantee bandwidth based on the bandwidth requirements using time division multiplexing.

20. The multi-processor system of claim 14 wherein the source processing node is configured to guarantee bandwidth based on the bandwidth requirements using spatial division multiplexing.

21. The multi-processor system of claim 14 wherein the destination processing element is configured to poll a plurality of channels to check if data is received into the receive buffer for the unidirectional channel.

22. The multi-processor system of claim 14 wherein the source processing element is configured to free the transmit buffer.

23. The multi-processor system of claim 14 wherein the destination processing element is configured to free the receive buffer.

24. The multi-processor system of claim 14 wherein the source processing element is configured to destroy the unidirectional channel.

25. The multi-processor system of claim 14 wherein the destination processing element is configured to receive a pointer for the data in the receive buffer into the destination processing element and receive the data from the receive buffer based on the pointer.

26. The multi-processor system of claim 14 wherein a time for a receive call in the destination processing element does not depend upon a size of the data.

27. The method of claim 1, further comprising:
receiving the first task in the source processing node, wherein the step of generating a channel is performed in response to receiving the first task.

28. The method of claim 1, further comprising:
determining a topology of processing nodes to process one or more tasks, the topology including the channel.

29. The method of claim 1, wherein the step of accepting the unidirectional channel includes:
receiving a response signal from the destination processing node by the source processing node.

30. The method of claim 1, further comprising:
assigning tasks to one or more nodes in the array of nodes, wherein said step of generating the unidirectional channel is performed in response to said step of assigning tasks.

31. The multi-processor system of claim 14, wherein the route for the unidirectional channel is further based on a physical description of the multi-processor system.

32. The multi-processor system of claim 14, wherein a compiler is configured to determine routing information for one or more channels and assign a task to one or more destination processing nodes.

33. The multi-processor system of claim 14, wherein the transmit buffer and receive buffer are allocated based on the one or more tasks and a physical description of a portion of the array of nodes over which the data is to be transmitted.

34. The method of claim 1, wherein determining a route for a unidirectional channel is based on an application description.

35. The method of claim 1, wherein generating the unidirectional channel along the determined route is based on an allocated communication bandwidth between a first task on the source processing node and a second task on the destination processing node.

* * * * *